US010538234B2

(12) United States Patent
Ito et al.

(10) Patent No.: US 10,538,234 B2
(45) Date of Patent: Jan. 21, 2020

(54) VEHICLE CONTROL DEVICE

(71) Applicant: DENSO CORPORATION, Kariya, Aichi-pref. (JP)

(72) Inventors: Yutaro Ito, Kariya (JP); Youhei Morimoto, Kariya (JP); Noriaki Ikemoto, Kariya (JP); Takahiro Narita, Kariya (JP); Masuhiro Kondo, Kariya (JP)

(73) Assignee: DENSO CORPORATION, Kariya (JP)

( * ) Notice: Subject to any disclaimer, the term of this patent is extended or adjusted under 35 U.S.C. 154(b) by 72 days.

(21) Appl. No.: 15/779,765

(22) PCT Filed: Nov. 8, 2016

(86) PCT No.: PCT/JP2016/083098
§ 371 (c)(1),
(2) Date: May 29, 2018

(87) PCT Pub. No.: WO2017/090423
PCT Pub. Date: Jun. 1, 2017

(65) Prior Publication Data
US 2019/0241174 A1 Aug. 8, 2019

(30) Foreign Application Priority Data

Nov. 27, 2015 (JP) .................. 2015-231392

(51) Int. Cl.
*B60W 20/14* (2016.01)
*B60W 20/12* (2016.01)
(Continued)

(52) U.S. Cl.
CPC ......... *B60W 20/14* (2016.01); *B60L 15/2018* (2013.01); *B60L 58/12* (2019.02);
(Continued)

(58) Field of Classification Search
CPC ....... B60W 20/14; B60W 20/12; B60L 58/12; B60L 15/2018; B60L 2240/62; B60L 2240/642
See application file for complete search history.

(56) References Cited

U.S. PATENT DOCUMENTS

| 5,778,326 A | 7/1998 | Moroto et al. |
| 5,832,396 A | 11/1998 | Moroto et al. |

(Continued)

FOREIGN PATENT DOCUMENTS

| JP | 2013-099994 A | 5/2013 |
| JP | 2014-103771 A | 6/2014 |

OTHER PUBLICATIONS

U.S. Appl. No. 15/779,732, filed May 29, 2018 in the name of Ito et al.

(Continued)

*Primary Examiner* — Sze-Hon Kong
(74) *Attorney, Agent, or Firm* — Oliff PLC

(57) ABSTRACT

A vehicle control device that includes a search unit that searches, based on geographic information to be supplied from a navigation device, for a deceleration start position before a downhill that is suited to regeneration by a motor; and a charge level control unit that performs, when a vehicle reaches the deceleration start position, deceleration control for reducing a charge level of a battery by reducing a vehicle speed. When the charge level control unit performs the deceleration control, the vehicle speed is reduced by reducing a driving force of the vehicle to a level at which only motor output is used as the driving force.

9 Claims, 14 Drawing Sheets

(51) Int. Cl.
 *B60L 15/20* (2006.01)
 *B60L 58/12* (2019.01)

(52) U.S. Cl.
 CPC .......... *B60W 20/12* (2016.01); *B60L 2240/62* (2013.01); *B60L 2240/642* (2013.01)

(56) References Cited

U.S. PATENT DOCUMENTS

| | | | |
|---|---|---|---|
| 6,507,127 | B1 | 1/2003 | Amano et al. |
| 8,996,218 | B2 * | 3/2015 | Gehring ................ B60W 10/06 701/22 |
| 2015/0019057 | A1 * | 1/2015 | Morisaki .................. B60L 7/18 701/22 |
| 2015/0314775 | A1 * | 11/2015 | Dextreit ............ B60W 50/0097 701/22 |
| 2017/0021823 | A1 * | 1/2017 | Ogawa .................... B60L 50/15 |
| 2017/0028981 | A1 * | 2/2017 | Ogawa ................... B60K 6/445 |
| 2017/0088117 | A1 * | 3/2017 | Ogawa .................... B60L 58/13 |
| 2017/0144650 | A1 * | 5/2017 | Nagamiya ............. B60W 20/12 |
| 2017/0159593 | A1 * | 6/2017 | Roos ................ B60W 50/0097 |

OTHER PUBLICATIONS

Jan. 24, 2017 International Search Report issued in International Patent Application No. PCT/JP2016/083098.
Jan. 24, 2017 International Search Report issued in International Patent Application No. PCT/JP2016/083099.

* cited by examiner

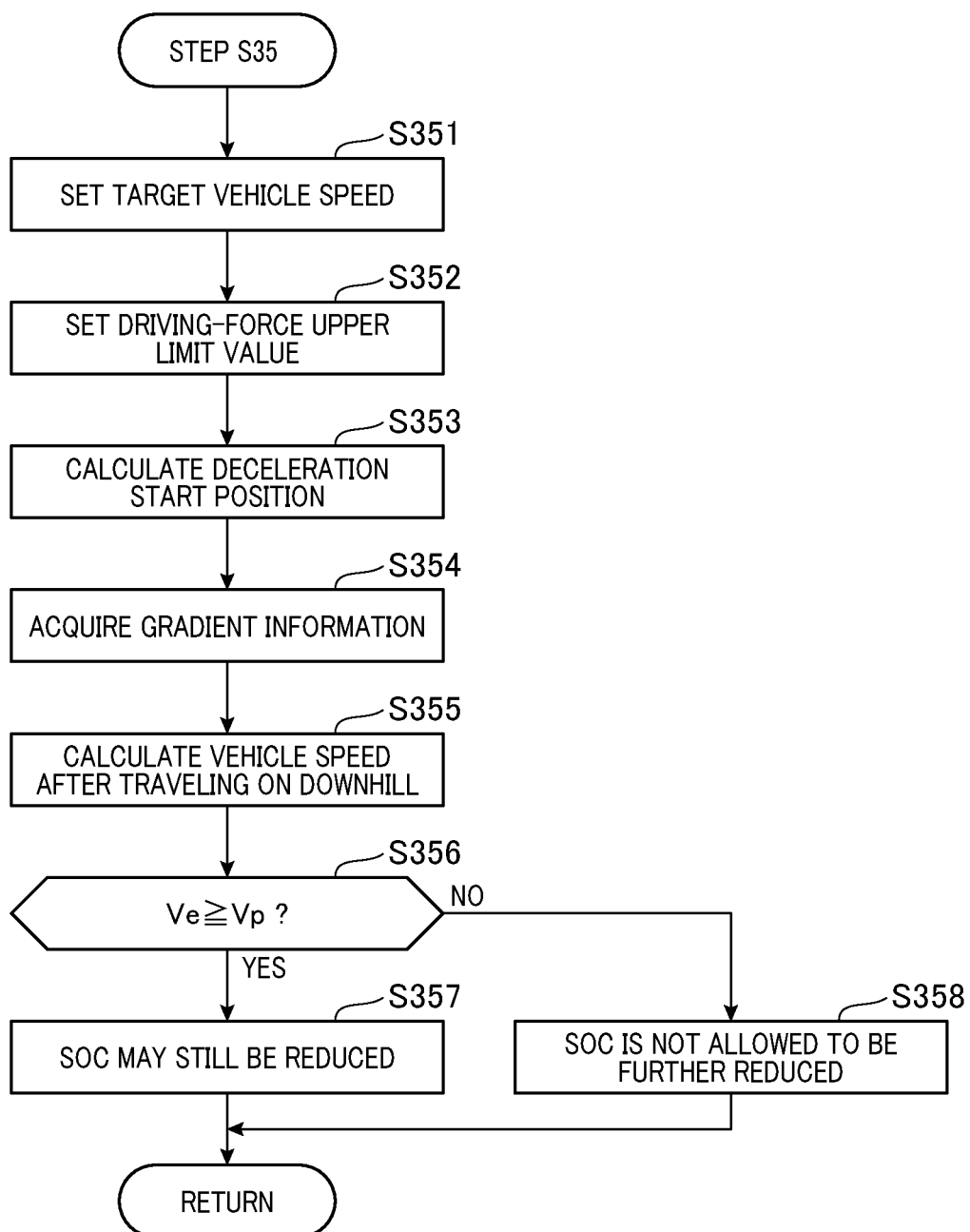

VEHICLE CONTROL DEVICE

CROSS REFERENCE TO RELATED APPLICATIONS

This application claims the benefit of Japanese Patent Application No. 2015-231392 filed on Nov. 27, 2015, the entire contents of which are incorporated herein by reference.

TECHNICAL FIELD

The present disclosure relates to vehicle control in a vehicle that uses motor output and engine output as a driving force.

BACKGROUND ART

Causing a motor to be rotated by rotation of the wheels such that the motor is used as a power generator has become known as regeneration. Electrical energy generated by the regeneration is used for charging a rechargeable battery. Further, the regeneration is controlled by a vehicle control device installed in the vehicle, and is performed when a predetermined driving condition is satisfied.

When the vehicle performs the regeneration while traveling downhill, potential energy based on a height difference of the downhill can be recovered as the electrical energy. However, when the rechargeable battery is fully charged during the regeneration, the energy generated by the regeneration needs to be discharged, for example, as heat. As a countermeasure, in the configuration disclosed in Patent Literature 1, a charge level of the rechargeable battery is reduced before the downhill so as to increase efficiency of the regeneration.

CITATION LIST

Patent Literature

[PTL 1] JP H08-126116 A

SUMMARY OF THE INVENTION

As a method of reducing the charge level, it is conceivable to reduce before the downhill the engine output to increase a ratio of the motor output. However, when a load on the engine is reduced, fuel efficiency of the vehicle is degraded, resulting in a problem of degradation in engine efficiency.

The present disclosure has been made to solve this problem, and it is an object thereof to provide a vehicle control device capable of increasing both efficiency of regeneration while traveling downhill and engine efficiency, thereby increasing energy efficiency of a vehicle.

According to an aspect of the present disclosure, there is provided a vehicle control device including an engine, and a motor that is driven by power to be supplied from a rechargeable battery. The vehicle control device controls a vehicle that uses at least one of engine output and motor output as a driving force. The vehicle control device includes a search unit and a charge level control unit. The search unit searches, based on geographic information to be supplied from a navigation device, for a downhill on which regeneration by the motor can be performed. The charge level control unit performs, at a deceleration start position before the downhill that has been specified, deceleration control for reducing a charge level of the rechargeable battery by reducing a vehicle speed. In the deceleration control, the vehicle speed is reduced by reducing the driving force of the vehicle to a level at which only the motor output is used as the driving force.

With this configuration, the charge level of the rechargeable battery is reduced before the regeneration on the downhill by reducing the vehicle speed, and hence efficiency of the regeneration while traveling downhill is increased. In this deceleration control, only the motor output is used as the driving force of the vehicle, and hence degradation in engine efficiency is restrained. As a result, both the efficiency of the regeneration and the engine efficiency can be increased, and energy efficiency of the vehicle can be increased.

BRIEF DESCRIPTION OF THE DRAWINGS

The above-described objects, other objects, features, and advantages of the present disclosure become more apparent in light of the following detailed description with reference to the accompanying drawings.

FIG. 12 is a flowchart showing processes of Step S35 in detail.

DESCRIPTION OF EMBODIMENTS

First Embodiment

Figure 1:
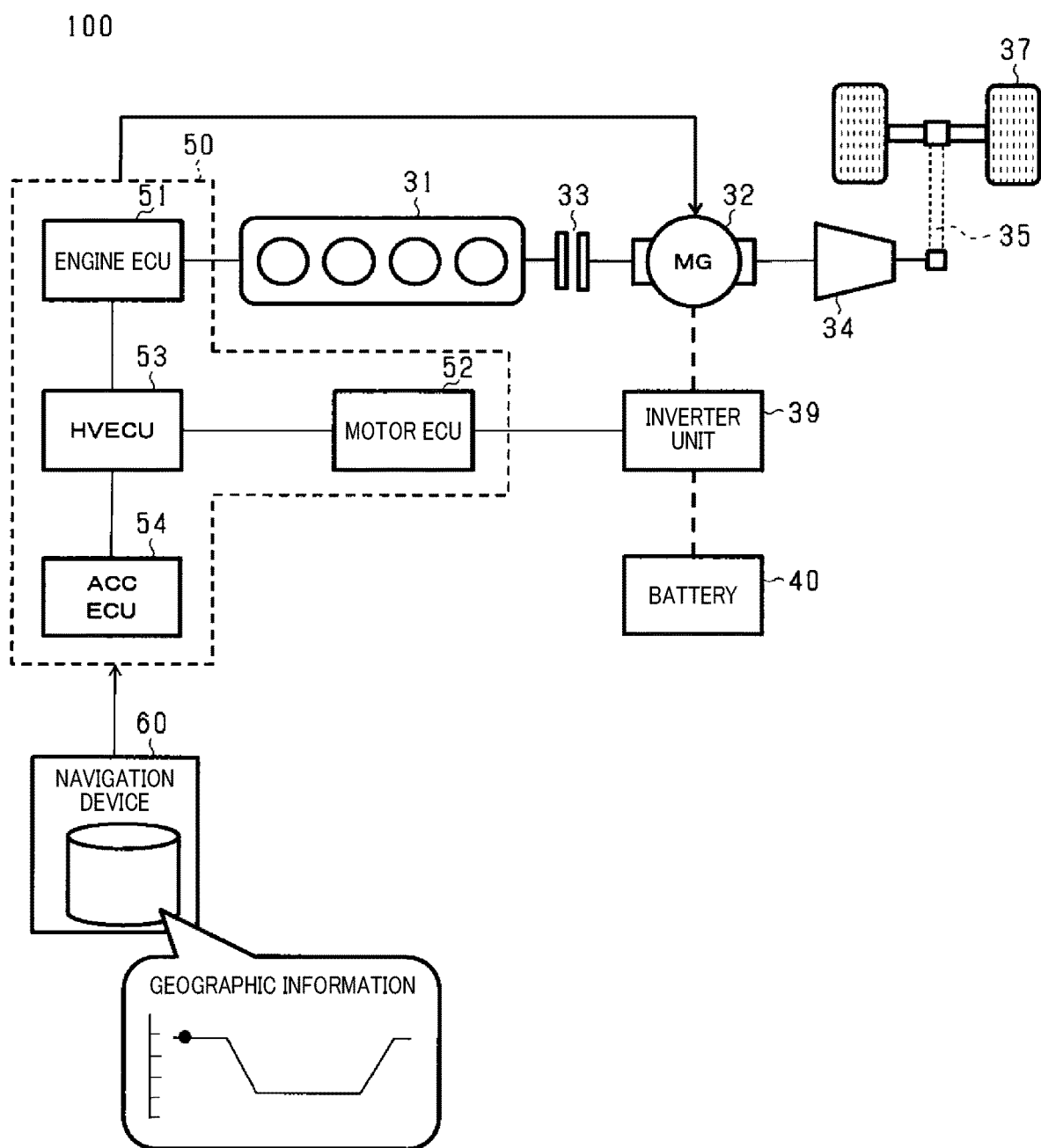
FIG. 1 is a diagram showing a configuration of a vehicle 100 as an example.

Embodiments according to the present disclosure are described with reference to the drawings. In the following description, a vehicle control device according to the embodiments is applied to a hybrid vehicle that obtains a vehicle driving force from an engine and a drive motor. Note that, the hybrid vehicle may be abbreviated as a vehicle. In addition, parts that are the same as or equivalent to each other among the embodiments described below are denoted by the same reference symbols in the drawings, and redundant description of the parts denoted by the same reference symbols is omitted.

FIG. 1 is a diagram showing a configuration of a vehicle 100 as an example. The vehicle 100 mainly includes an engine 31, a motor 32 being a motor generator, a clutch 33, a transmission 34, a drive shaft 35, drive wheels 37, an inverter unit 39, a battery (rechargeable battery) 40, and a vehicle control device 50. Further, the vehicle 100 also includes a navigation device 60, and the vehicle control device 50 is capable of acquiring geographic information from this navigation device 60.

The engine 31 generates a desired engine output by combusting, in combustion chambers, a mixture of air and fuel that is injected from fuel injection valves.
As examples of the engine 31, there may be mentioned a gasoline engine that uses gasoline as fuel and a diesel engine that uses, for example, light oil as fuel.

The motor 32 generates motor output by being rotated with power from the battery 40, and also functions as a power generator that generates power for the battery 40. The motor 32, which is an AC motor that is driven by AC power, includes a rotor as a rotary element, and a stator that is arranged around the rotor and generates an induction voltage. The rotor is connected, via the transmission 34, to the drive shaft 35 that rotates the drive wheels 37. The stator is connected to the battery 40 via the inverter unit 39.

The inverter unit 39 functions as a power conversion device that performs power conversion between DC power that is supplied from the battery 40 and AC power that is generated by the motor 32. For example, the inverter unit 39 includes a converter that converts the AC power to the DC power, and an inverter that converts the DC power to the AC power. When the motor 32 is driven, the stator generates the induction voltage in a different phase with use of the AC power supplied from the battery 40 via the inverter unit 39 so as to rotate the rotor. Further, when the motor 32 performs regeneration, the rotor is rotated by rotation of the drive wheels 37. With this, the AC power is generated in the stator. This generated power is rectified by the inverter unit 39, and then supplied to the battery 40. The battery 40 is charged with this supplied power.

The clutch 33 functions as a transmission switching unit that disconnects the engine output being a part of the driving force of the vehicle 100. The engine 31 is drive-coupled to an output shaft of the motor 32 via the clutch 33. Thus, in an HV drive mode, the engine 31 and the motor 32 are coupled to each other via the clutch 33, and the vehicle 100 travels by obtaining the driving force from both the engine output and the motor output. Meanwhile, in an EV drive mode, the engine 31 is disconnected from the motor 32 by the clutch 33, and the vehicle 100 travels by obtaining the driving force only from the motor output.

The vehicle control device 50 refers collectively to devices that control units in the vehicle 100, specifically, an engine ECU 51, a motor ECU 52, an HVECU 53, and an ACCECU 54. The engine ECU 51 controls and drives the engine 31. The motor ECU 52 controls and drives the motor 32 and the inverter unit 39. The HVECU 53 performs cooperative control between the engine ECU 51 and the motor ECU 52 so as to control the drive modes of the vehicle 100. The ACCECU 54 develops a travel plan for the vehicle 100 in a cruise control mode (under constant-speed control) based on the geographic information that is supplied from the navigation device 60.

These ECUs 51 to 54 each mainly include a well-known microcomputer including a CPU, ROM, and RAM. Further, the ECUs 51 to 54 are electrically connected to each other via a bus so as to be capable of performing bidirectional communication. With this, the ECUs 51 to 54 are capable of controlling the driving, in response to a detected signal or an operation signal input to any of the ECUs, of various devices connected to outputs of other ones of the ECUs.

The navigation device 60 provides geographic information to the vehicle 100. The navigation device 60 is, for example, a car navigation system or a smartphone, and is connected to the ACCECU 54 in a wired or wireless manner. The geographic information includes map information items such as a latitude, longitude, and altitude, and relevant information items of, for example, facilities related to the map information items. The geographic information is managed by a database (not shown). From the geographic information acquired via the navigation device 60, the ACCECU 54 can acquire information items necessary for traveling of and regeneration in the vehicle 100.

Figure 2A:
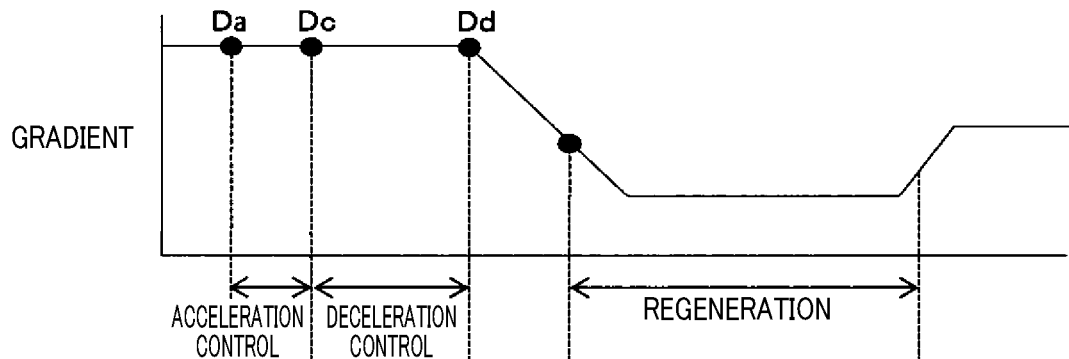
FIG. 2A is a chart showing a travel route of the vehicle and a gradient of the travel route.
Figure 2B:
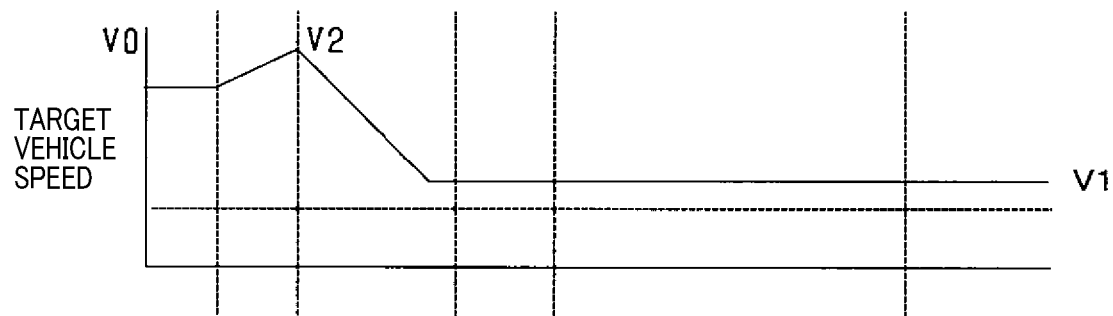
FIG. 2B is an explanatory chart showing changes in a target vehicle speed under cruise control.
Figure 2C:
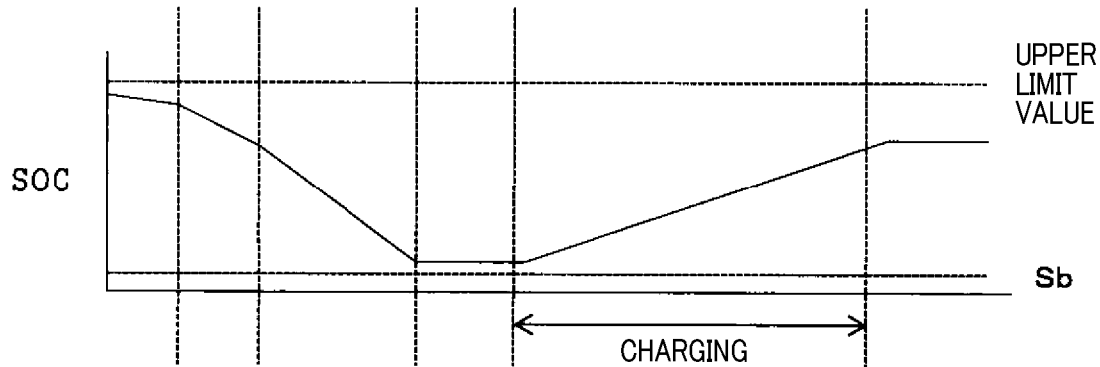
FIG. 2C is an explanatory chart showing changes in a charge level SOC of a battery.
Figure 2D:
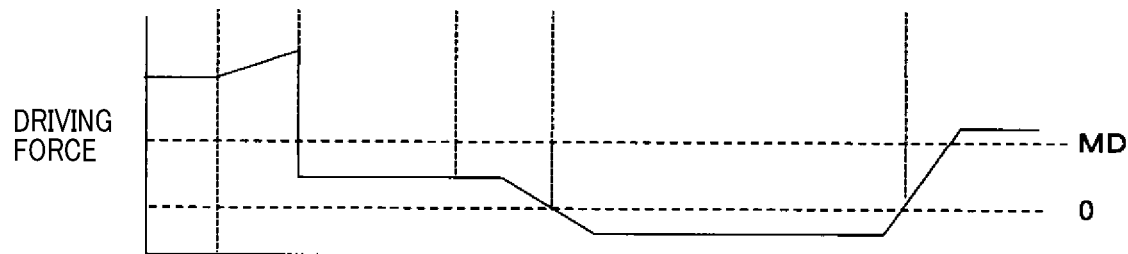
FIG. 2D is an explanatory chart showing changes in a driving force of the vehicle.

Next, operations during the regeneration in the vehicle 100 are described with reference to FIG. 2. FIG. 2A is a chart showing a travel route of the vehicle 100 and a gradient of the travel route. FIG. 2B is an explanatory chart showing changes in a target vehicle speed under the cruise control. FIG. 2C is an explanatory chart showing changes in a charge level SOC of the battery 40. FIG. 2D is an explanatory chart showing changes in the driving force of the vehicle 100.

On a downhill satisfying a predetermined condition, the vehicle 100 starts regeneration for charging the battery 40. In FIG. 2A, the regeneration is started while traveling downhill, and the regeneration is continued even after traveling downhill by utilizing a low-load state as a result of traveling downhill. During regeneration, the battery 40 is charged with the power generated by the motor 32, and the charge level SOC is increased (FIG. 2C).

When the vehicle 100 travels on a long downhill or a downhill with a high gradient, the charge level SOC of the battery 40 may exceed its upper limit value during the regeneration that utilizes traveling downhill. An excess of the power over the upper limit value needs to be discharged, for example, as heat, and hence efficiency of the regeneration is degraded. As a countermeasure, before starting the regeneration, the vehicle 100 performs deceleration control for reducing the charge level SOC of the battery 40. In the deceleration control, the vehicle 100 is decelerated (FIG. 2B) such that the charge level SOC of the battery 40 is reduced (FIG. 2C). This deceleration control is performed by reducing the driving force of the vehicle 100 to a range corresponding to the EV drive mode. The charge level SOC is reduced by the deceleration control before the start of the regeneration (FIG. 2C), and then the battery 40 is charged by the regeneration that utilizes the traveling downhill. With this, the charge level SOC can be increased.

Figure 3:
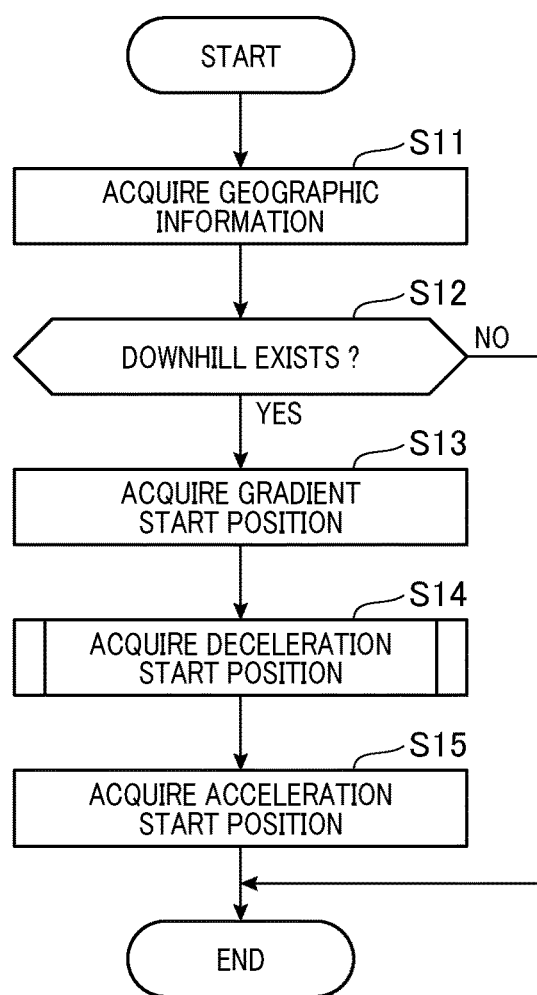
FIG. 3 is an explanatory flowchart showing processes when developing a travel plan for the vehicle 100.

Next, specific processes by the vehicle control device 50 for performing the drive control of the vehicle 100, which is shown in FIG. 2A to FIG. 2D, are described with reference to the other drawings. FIG. 3 is an explanatory flowchart showing processes when developing a travel plan for the vehicle 100. The travel planning process shown in FIG. 3 is implemented, for example, in the cruise control mode (constant vehicle speed mode) for causing the vehicle 100 to travel at a vehicle speed in a certain range. Note that, the ACCECU 54 executes processes of Steps S11 to S13 so that the vehicle control device 50 functions as a search unit. Further, the ACCECU 54 executes processes of Steps S14 and S15 so that the vehicle control device 50 functions as a deceleration position search unit.

In Step S11, the ACCECU 54 acquires the geographic information necessary for the travel plan. The geographic information to be acquired in Step S11 is acquired, for example, based on the travel route selected via the navigation device 60 by a driver or another passenger. The geographic information includes a latitude, longitude, a gradient information item, and a downhill gradient distance at each point on the travel route. The ACCECU 54 requests the navigation device 60 to supply this geographic information.

In Step S12, the ACCECU 54 searches for a downhill on which the regeneration can be performed. The downhill on which the regeneration can be performed is selected based, for example, on the acquired gradient information items from among downhills each having a predetermined gradient angle or higher and a predetermined gradient distance or longer. The ACCECU 54 searches for any appropriate downhill based on the geographic information acquired in Step S11.

When an appropriate downhill is detected (YES at Step S12), in Step S13, the ACCECU 54 acquires a gradient start position Dd of the downhill. For example, the ACCECU 54 sets, as the gradient start position Dd, a latitude and longitude of a position where a gradient of the downhill starts. Note that, when no appropriate downhill is detected (NO at Step S12), the travel planning process is ended.

In Step S14, the ACCECU 54 acquires a deceleration start position Dc where the deceleration control is started. The deceleration start position Dc refers to a position where the deceleration control of the vehicle 100 is started. The deceleration start position Dc to be acquired is a position before the registered gradient start position Dd on the travel route, the position Dd being set in Step S13.

Figure 4:
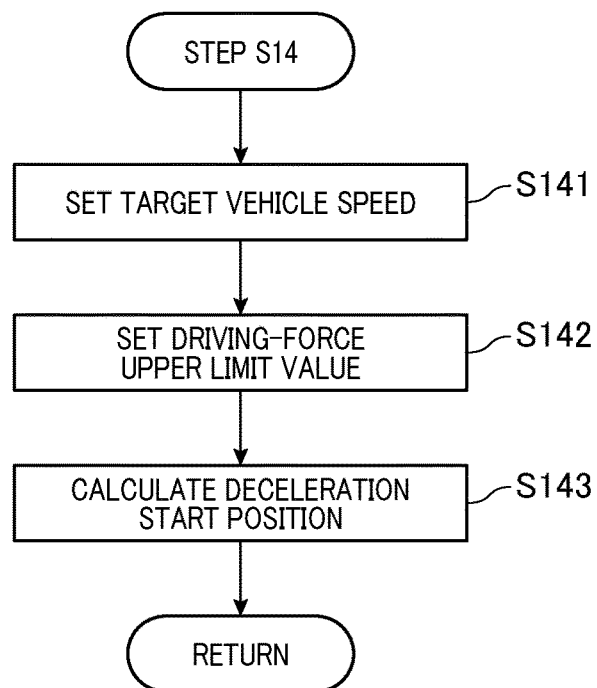
FIG. 4 is an explanatory flowchart showing in detail how a deceleration start position Dc is acquired.
Figure 5A:
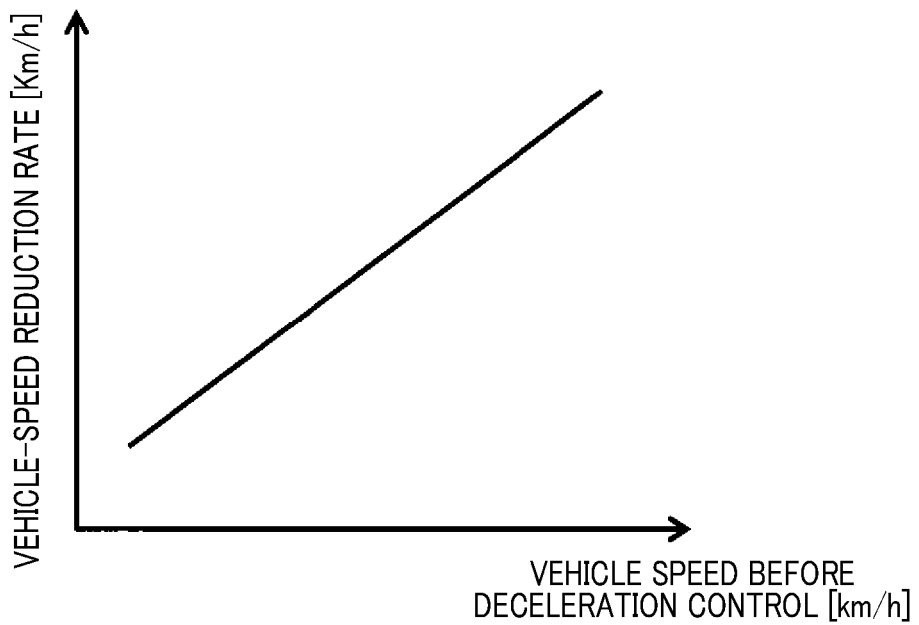
FIG. 5A is an explanatory chart showing how a vehicle speed is controlled in deceleration control.
Figure 5B:
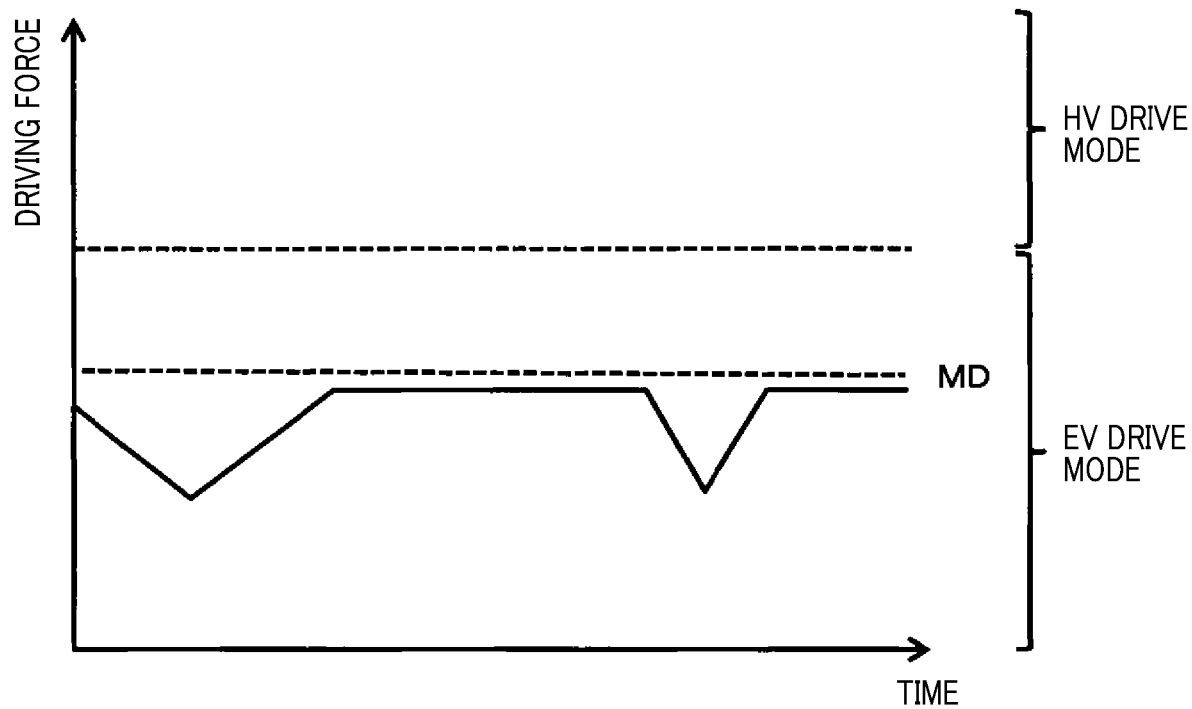
FIG. 5B is an explanatory chart showing how the driving force is controlled in the deceleration control.

FIG. 4 is an explanatory flowchart showing in detail an example of how the deceleration start position Dc is acquired in Step S14. Further, FIG. 5A and FIG. 5B are explanatory charts showing how a vehicle speed or the driving force is controlled in the deceleration control. In this embodiment, the deceleration start position Dc is acquired by calculation based on the target vehicle speed V and a driving-force upper limit value MD in the deceleration control.

First, in Step S141, the ACCECU 54 sets a target vehicle speed V1. The target vehicle speed V1 refers to a speed that the vehicle 100 finally reaches by the deceleration control of the vehicle 100. The ACCECU 54 sets the target vehicle speed V1 such that, as shown in FIG. 5A, a reduction rate of the vehicle speed by the deceleration control increases according to a vehicle speed before the deceleration control.

In Step S142, the ACCECU 54 sets the driving-force upper limit value MD. The driving-force upper limit value MD refers to a value for setting an upper limit of the driving force that the vehicle 100 is allowed to output. As shown in FIG. 5B, the drive modes of the vehicle 100 are switched by changing a ratio of the engine output and the motor output in the driving force. The ACCECU 54 sets the driving-force upper limit value MD to be within a driving-force range corresponding to the EV drive mode. With this, in the deceleration control, driving of the engine 31 (engine output) is limited, and only the output from the motor 32 (motor output) is used as the driving force of the vehicle 100.

In Step S143, based on the target vehicle speed set in Step S141 and on the driving-force upper limit value MD set in Step S142, the ACCECU 54 calculates the deceleration start position Dc. For example, first, the ACCECU 54 calculates a distance necessary for the vehicle 100 to reach the target vehicle speed V1 based on the set driving-force upper limit value MD. Then, the ACCECU 54 uses the calculated distance as a point-to-point distance L from the gradient start position Dd acquired in Step S13 to the deceleration start position Dc. In this way, the deceleration start position Dc on the travel route is calculated.

Referring back to FIG. 3, in Step S15, the ACCECU 54 acquires an acceleration start position Da. The acceleration start position Da refers to a position before the deceleration start position Dc acquired in Step S14, that is, a position where the vehicle 100 starts acceleration control. In the acceleration control, the vehicle 100 is accelerated before the start of the deceleration control such that the vehicle-speed reduction rate of the vehicle 100 in the deceleration control is secured. The acceleration start position Da to be acquired by the ACCECU 54 is, for example, a position at predetermined distance before the deceleration start position Dc.

When the acceleration start position Da is acquired, the travel planning process is ended.

Figure 6:
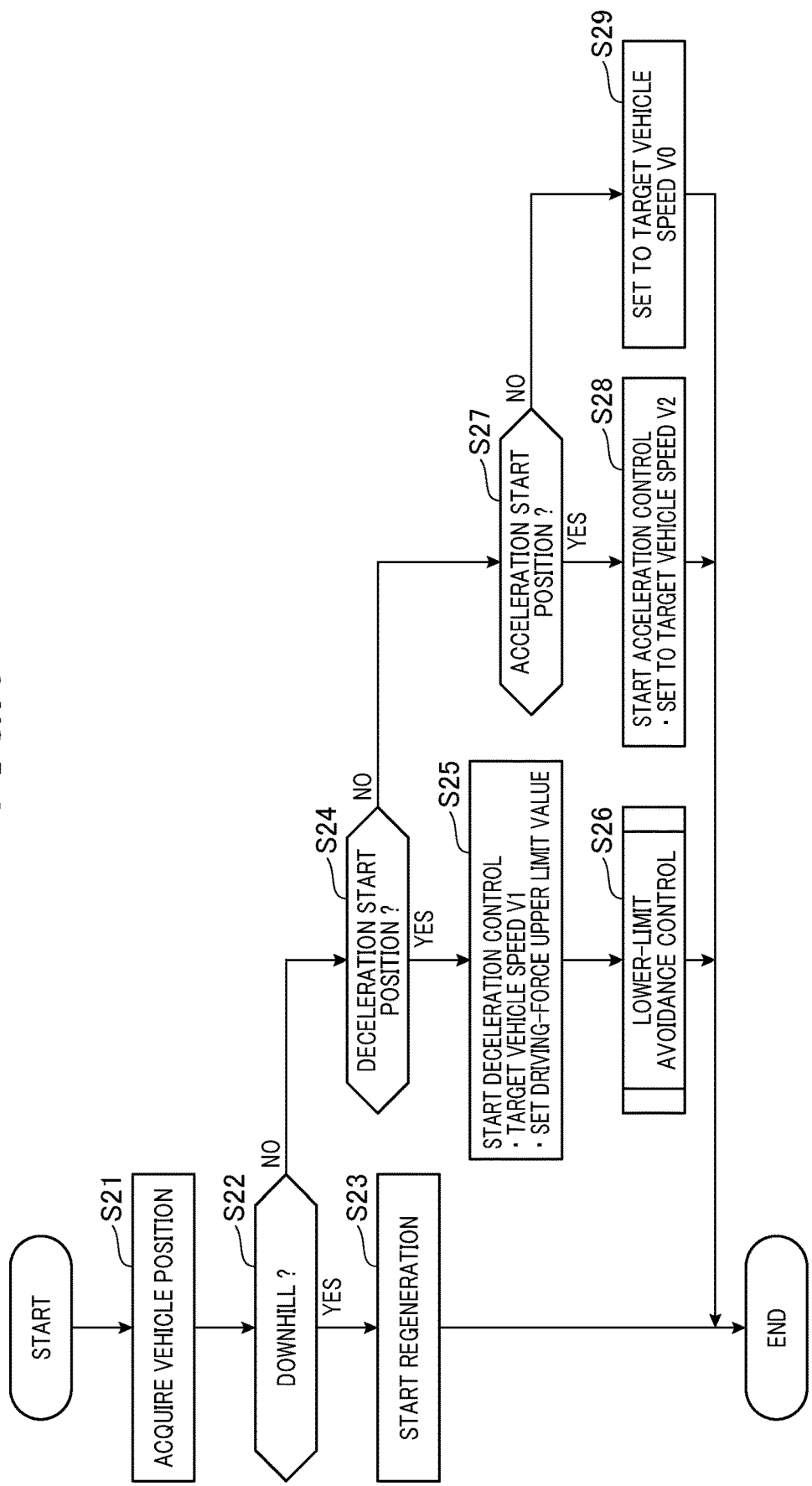
FIG. 6 is an explanatory flowchart showing drive control of the vehicle 100.

Next, drive control with use of the positions (Dd, Dc, and Da) acquired in the travel plan and during the regeneration in the vehicle 100 is described. FIG. 6 is an explanatory flowchart showing the drive control of the vehicle 100. The HVECU 53 executes processes of Steps S24 to S28 in FIG. 6 so that the vehicle control device 50 functions as a charge level control unit.

In Step S21, the HVECU 53 acquires a current vehicle position Dp. The vehicle position Dp refers to a current position of the vehicle 100 in motion, which is acquired from the navigation device 60 via the ACCECU 54.

In Step S22, the HVECU 53 determines whether the vehicle 100 has reached the gradient start position Dd where the regeneration is started. The HVECU 53 compares the vehicle position Dp acquired in Step S21 and the gradient start position Dd acquired in the travel plan to each other, and determines whether the vehicle 100 has reached the gradient start position Dd.

In the case where the vehicle 100 has not yet reached the gradient start position Dd (NO at Step S22), in Step S24, the HVECU 53 determines whether the vehicle 100 has reached the deceleration start position Dc where the vehicle 100 starts the deceleration control. The HVECU 53 compares the vehicle position Dp and the deceleration start position Dc acquired in the travel plan to each other, and determines whether the vehicle 100 has reached the deceleration start position Dc.

In the case where the vehicle 100 has not yet reached the deceleration start position Dc (NO at Step S24), in Step S27, the HVECU 53 determines whether the vehicle 100 has reached the acceleration start position Da where the acceleration control is performed. The HVECU 53 compares the vehicle position Dp and the acceleration start position Da acquired in the travel plan, and determines whether the vehicle 100 has reached the acceleration start position Da.

In the case where the vehicle 100 has not yet reached the acceleration start position Da (NO at Step S27), in Step S29, the HVECU 53 sets a target vehicle speed V0. The target vehicle speed V0 refers to a vehicle speed of the vehicle 100 within a range set by the cruise control. In other words, in Step S29, the HVECU 53 keeps the vehicle speed within a range of the target vehicle speed V0 set by the cruise control.

Meanwhile, in the case where the vehicle position Dp has reached the acceleration start position Da (YES at Step S27), in Step S28, the HVECU 53 starts the acceleration control. In the acceleration control, the HVECU 53 sets a target vehicle speed V2 to cause the vehicle speed to be higher than a current vehicle speed (V0). In accordance with the target vehicle speed V2 set in Step S28, the engine ECU 51 and the motor ECU 52 increase driving forces of the engine 31 and the motor 32 so as to accelerate the vehicle 100.

Figure 7A:
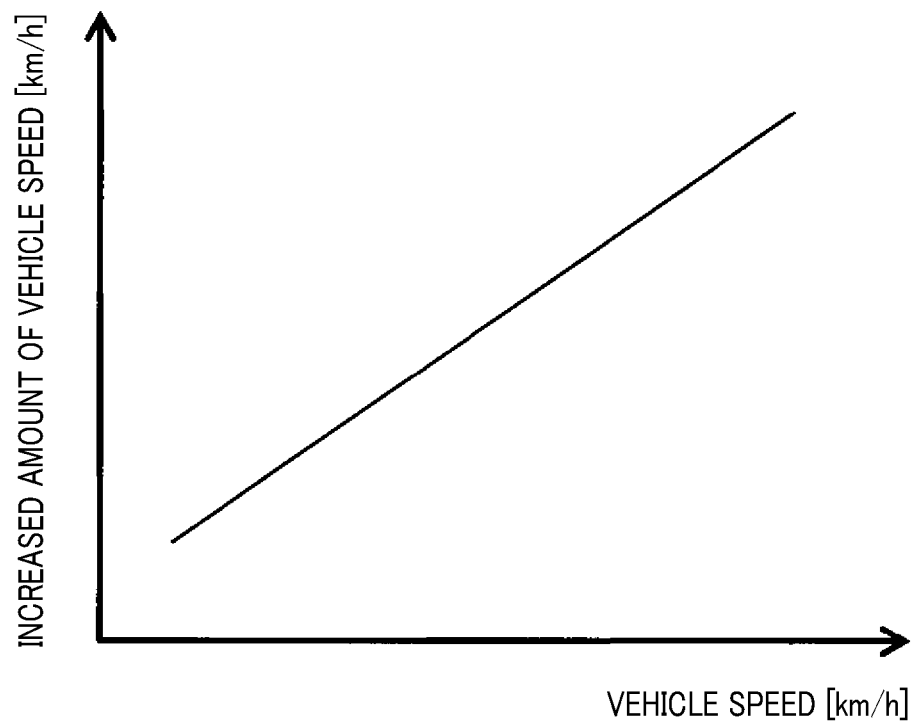
FIG. 7A is an explanatory chart showing how the vehicle speed is controlled in acceleration control.
Figure 7B:
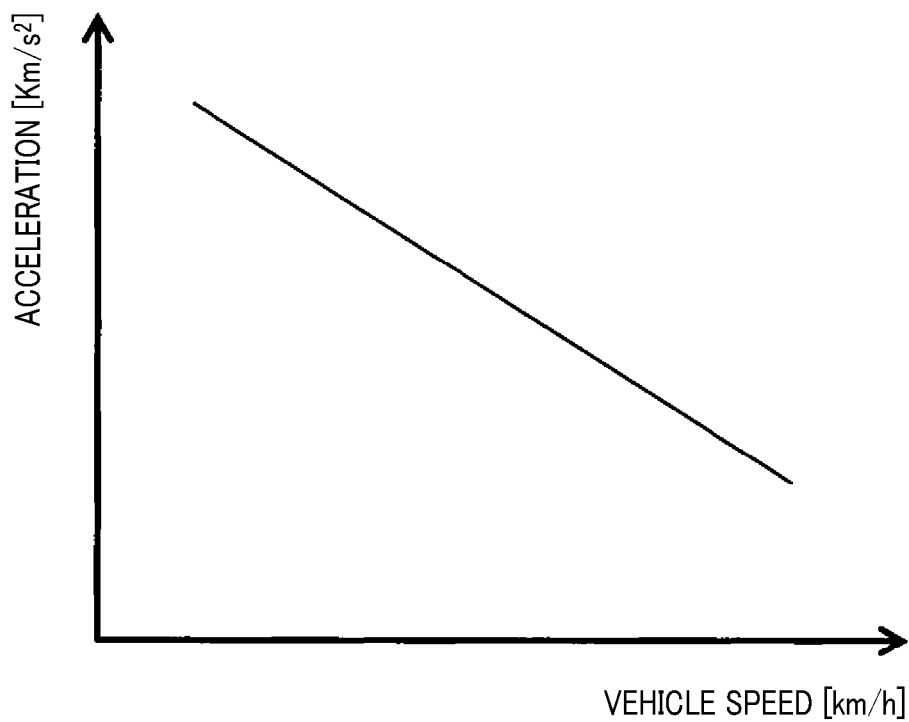
FIG. 7B is an explanatory chart showing how the vehicle speed is controlled in the acceleration control.

FIG. 7A and FIG. 7B are explanatory charts showing an example of how the vehicle speed is controlled in the acceleration control. The HVECU 53 sets the target vehicle speed V2 in the acceleration control such that, as shown in FIG. 7A, an increased amount of the vehicle speed becomes higher as a current vehicle speed Vp becomes higher. Further, the HVECU 53 sets acceleration in the acceleration control such that, as shown in FIG. 7B, the acceleration becomes lower as the current vehicle speed Vp becomes higher.

Referring back to FIG. 6, in the case where the vehicle 100 has reached the deceleration start position Dc (YES at Step S24), in Step S25, the HVECU 53 starts the deceleration control. In the deceleration control, the HVECU 53 causes the vehicle speed to be lower than the vehicle speed V0 before the acceleration so as to reduce the charge level SOC of the battery 40. At this time, the HVECU 53 limits the driving force to be within a range in which the driving-force upper limit value MD set in the travel plan (FIG. 5B) is not exceeded. Thus, the vehicle 100 is switched to the EV drive mode, and starts to travel at reduced speed.

In Step S26, the HVECU 53 performs lower-limit avoidance control. The lower-limit avoidance control refers to control for preventing extreme reduction of the charge level SOC of the battery 40 as a result of performing the deceleration control. When the charge level SOC of the battery 40 significantly decreases in the deceleration control, the HVECU 53 performs the lower-limit avoidance control so as to stop the deceleration control, and to restore the vehicle speed to the vehicle speed V0 set in the cruise control.

Figure 8:
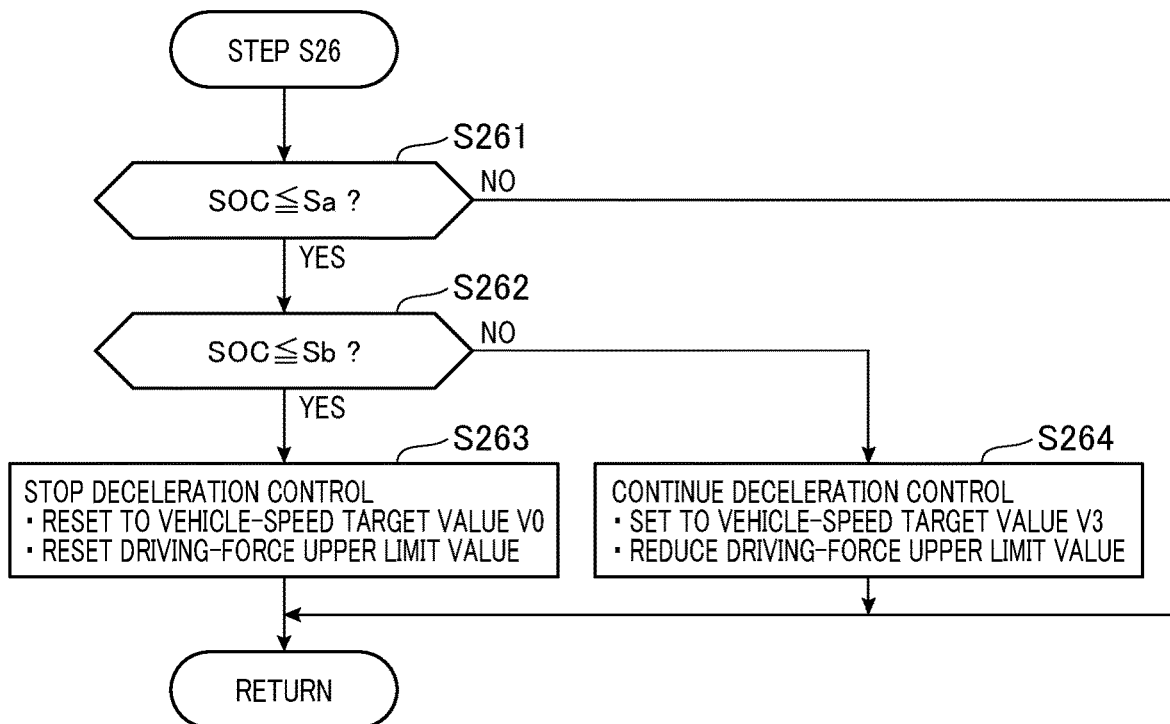
FIG. 8 is an explanatory flowchart showing lower-limit avoidance control in detail.
Figure 9:
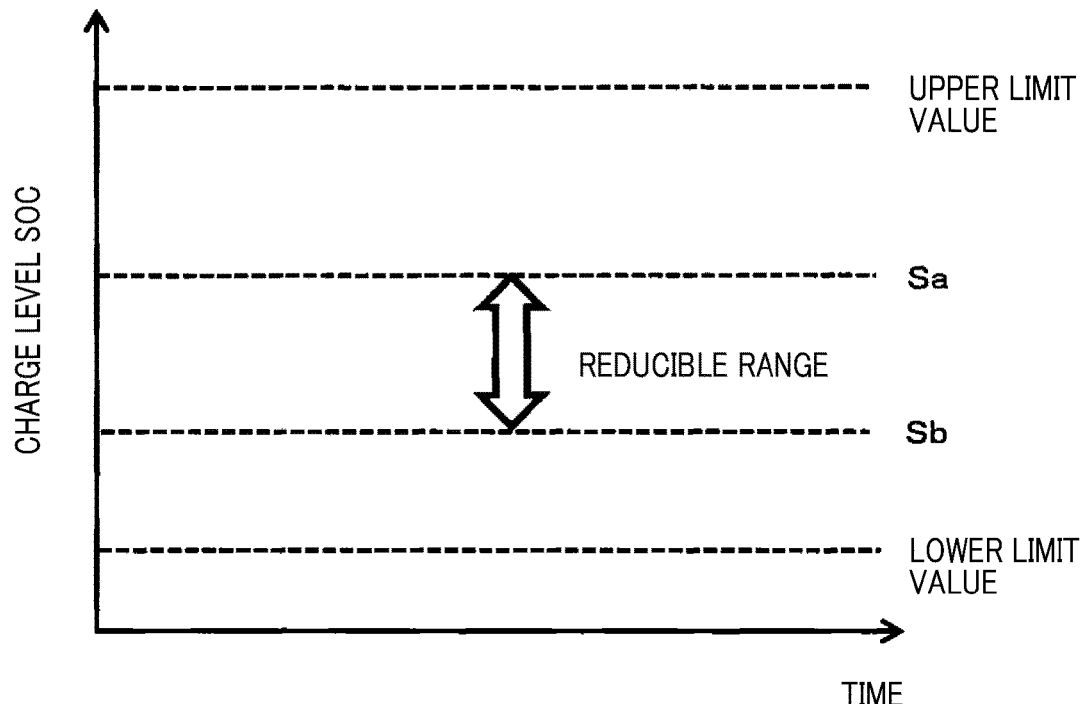
FIG. 9 is an explanatory chart showing the lower-limit avoidance control.

FIG. 8 is an explanatory flowchart showing in detail the lower-limit avoidance control that is performed in Step S26. FIG. 9 is an explanatory chart showing the lower-limit avoidance control.

In Step S261, the HVECU 53 compares the charge level SOC to a threshold Sa. As shown in FIG. 9, the threshold Sa refers to a maximum value of the charge level SOC after the reduction that is required in the deceleration control. In other words, when the deceleration control is performed, the vehicle speed is controlled such that the charge level SOC of the battery 40 is equal to or less than the threshold Sa.

When the charge level SOC is more than the threshold Sa (NO at Step S261), the HVECU 53 ends the lower-limit avoidance control. This is because it can be determined that, when the charge level SOC is more than the threshold Sa, the battery 40 is sufficiently charged, and the charge level SOC is not excessively reduced even when the deceleration control is continued.

When the charge level SOC is equal to or less than the threshold Sa (YES at Step S261), in Step S262, the HVECU 53 compares the charge level SOC to a threshold Sb. The threshold Sb refers to an allowable lower limit value of the charge level SOC in the deceleration control. The threshold Sb is experimentally acquired based, for example, on at which charge level SOC of the battery 40 starts to be deteriorated. Thus, in the deceleration control, the charge level SOC of the battery 40 is reduced within a range from the threshold Sa to the threshold Sb (FIG. 9).

When the charge level SOC is more than the threshold Sb (NO at Step S262), in Step S264, the HVECU 53 reduces a reduction rate of the charge level SOC in the deceleration control. In this case, the HVECU 53 sets a vehicle-speed target value higher than the vehicle speed V1 that is set in the deceleration control (sets a target vehicle speed V3), and reduces the driving-force upper limit value MD. As described above, the driving-force upper limit value MD is set within the driving-force range in which the vehicle 100 is in the EV drive mode. Thus, when the driving-force upper limit value MD is reduced, the reduction rate of the charge level SOC is reduced despite continuation of the deceleration control.

When the charge level SOC is equal to or less than the threshold Sb (YES at Step S262), in Step S263, the HVECU 53 stops the deceleration control. When the deceleration control is continued in this case, there arises a risk that the charge level SOC may fall below the threshold Sb. As a countermeasure, the HVECU 53 resets the vehicle-speed target value to V0, and resets the driving-force upper limit value MD into a range in which the engine 31 is driven.

Referring back to FIG. 6, in the case where the vehicle 100 has reached the gradient start position Dd (YES at Step S22), in Step S23, the HVECU 53 starts the regeneration. Thus, the power, which is generated by the motor 32 through the regeneration that is started by the vehicle 100 while traveling downhill, is supplied to the battery 40 via the inverter unit 39, and the battery 40 starts to be charged.

As described above in this first embodiment, the vehicle control device 50 performs the deceleration control for reducing the charge level SOC of the battery 40 before the regeneration on the downhill so as to increase the efficiency of the regeneration by the vehicle 100 while traveling downhill. In this deceleration control, the engine 31 is stopped by reducing the driving force of the vehicle 100 to a level at which only the motor output is used as the driving force. With this, degradation in engine efficiency is restrained. As a result, both the efficiency of the regeneration and the engine efficiency can be increased, and energy efficiency of the vehicle 100 can be increased.

In order to increase the driving force, the vehicle 100 is switched from a mode of using only the motor output to a mode of using the engine output and the motor output in combination with each other. In the deceleration control, the upper limit value of the driving force of the vehicle 100 is set within the range in which only the motor output is used. With this configuration, in the deceleration control, the driving force is set within the range in which only the motor output is used. As a result, the degradation in engine efficiency can be restrained irrespective of the drive modes of the vehicle 100.

The charge level control unit monitors changes in the charge level of the battery 40 during the deceleration control. When the reduction rate of the charge level SOC is high, the charge level control unit stops the deceleration control. With this configuration, the charge level SOC can be prevented from being excessively reduced by the deceleration control before the start of the regeneration. As a result, deterioration of the battery 40 can be reduced.

The deceleration position search unit searches for the deceleration start position based on the vehicle speed after the deceleration of the vehicle 100, which is set in the deceleration control. With this configuration, the deceleration start position can be searched for based on the target vehicle speed of the vehicle 100, which is set in the deceleration control. As a result, a deceleration start position appropriate for performing the vehicle speed reduction necessary in the deceleration control can be set.

The deceleration position search unit sets the vehicle speed after the deceleration such that the vehicle-speed reduction rate becomes higher as the vehicle speed of the vehicle 100 before the deceleration control becomes higher. With this setting, during low-speed traveling, the vehicle speed can be restrained from being excessively reduced by the deceleration control. As a result, degradation in drivability can be reduced.

The charge level control unit performs the acceleration control for accelerating the vehicle 100 before performing the deceleration control. With this configuration, the vehicle speed can be increased before the deceleration. As a result, even when the vehicle 100 is traveling at low speed, the vehicle-speed reduction rate can be secured. In addition, the vehicle speed can be prevented from being excessively reduced by the deceleration control, and hence degradation in drivability can be restrained.

The charge level control unit increases the increased amount of the vehicle speed in the acceleration control as the vehicle speed of the vehicle 100 before the acceleration control becomes higher. With this configuration, a sense of discomfort to the driver and the other passengers, which is caused as a result of the acceleration of the vehicle by the acceleration control, can be alleviated.

The charge level control unit performs the deceleration control when the vehicle 100 is in the cruise control mode (constant-speed control mode). With this configuration, in the constant-speed control mode at a preset speed, vehicle speed control can be performed without causing the driver to feel a sense of discomfort.

Second Embodiment

A configuration of this second embodiment is the same as the configuration of the first embodiment in performing regeneration on a downhill, but is different from the configuration of the first embodiment in that downhill acceleration control for accelerating the vehicle 100 is performed in a specific zone on the downhill in which the regeneration is performed.

FIG. 10 are explanatory charts showing processes for regeneration in the second embodiment. FIG. 10A is a chart showing a travel route of the vehicle 100 and a gradient of the travel route. FIG. 10B is an explanatory chart showing changes in the target vehicle speed. FIG. 10C is an explanatory chart showing changes in the charge level SOC of the battery 40. FIG. 10D is an explanatory chart showing changes in the driving force of the vehicle 100.

Also in this second embodiment, as shown in FIGS. 10A to 10D, the vehicle 100 performs the regeneration on a downhill satisfying a predetermined condition. Also in this embodiment, the ACCECU 54 searches for a downhill satisfying the condition for performing regeneration, and the regeneration is started when the vehicle 100 reaches this downhill. Further, also in the drive control shown in FIGS. 10A to 10D, the deceleration control is performed before the regeneration is performed. Note that, also in this second embodiment, the acceleration control may be performed before the deceleration control.

Figure 10A:
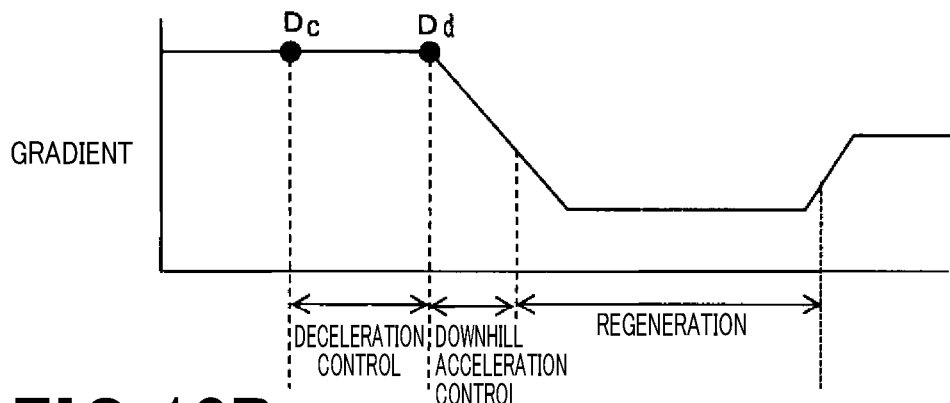
FIG. 10A is a chart showing a travel route of the vehicle and a gradient of the travel route.
Figure 10B:
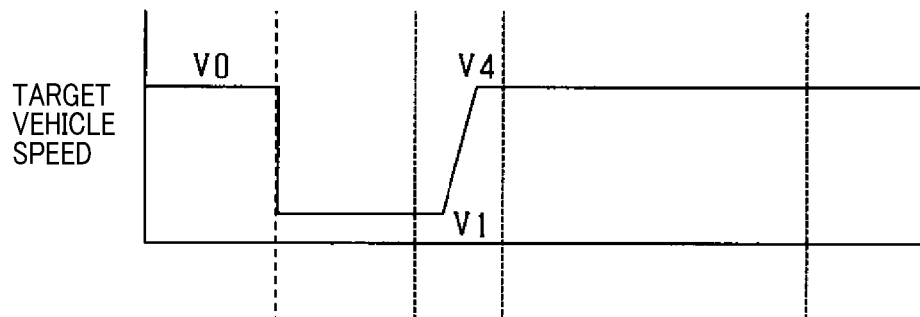
FIG. 10B is an explanatory chart showing changes in the target vehicle speed.
Figure 10C:
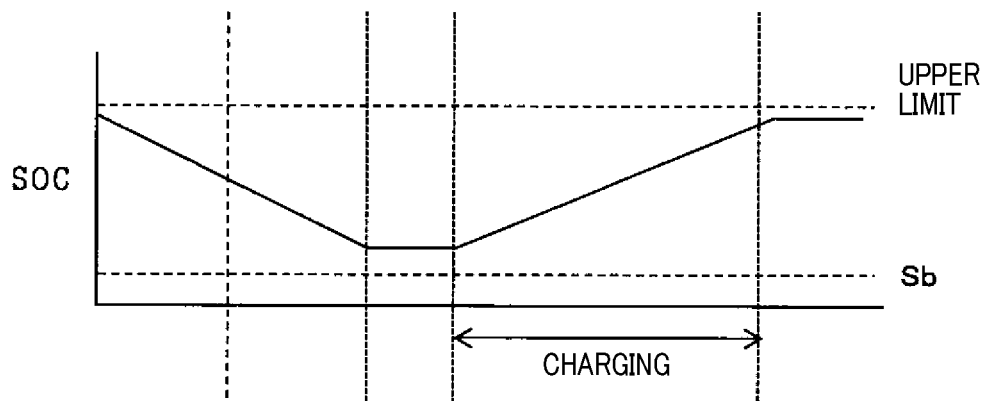
FIG. 10C is an explanatory chart showing changes in the charge level SOC of the battery.
Figure 10D:
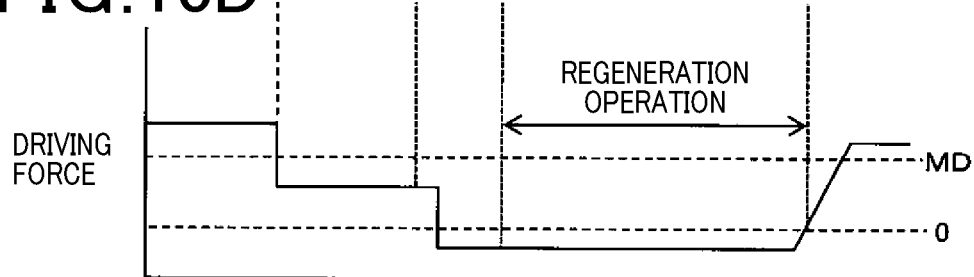
FIG. 10D is an explanatory chart showing changes in the driving force of the vehicle.

In addition, in a specific zone on the downhill in which the regeneration is performed, the vehicle 100 performs the downhill acceleration control for increasing its vehicle speed. In the downhill acceleration control, in the specific zone on the downhill, the vehicle 100 is accelerated by converting some of potential energy while traveling downhill to kinetic energy of the vehicle without using the engine output as the driving force (FIGS. 10B and 10D). As a result, loss in the regeneration is reduced. In addition, the kinetic energy of the vehicle 100 while traveling downhill is increased, and hence the energy efficiency of the vehicle is increased.

Figure 11:
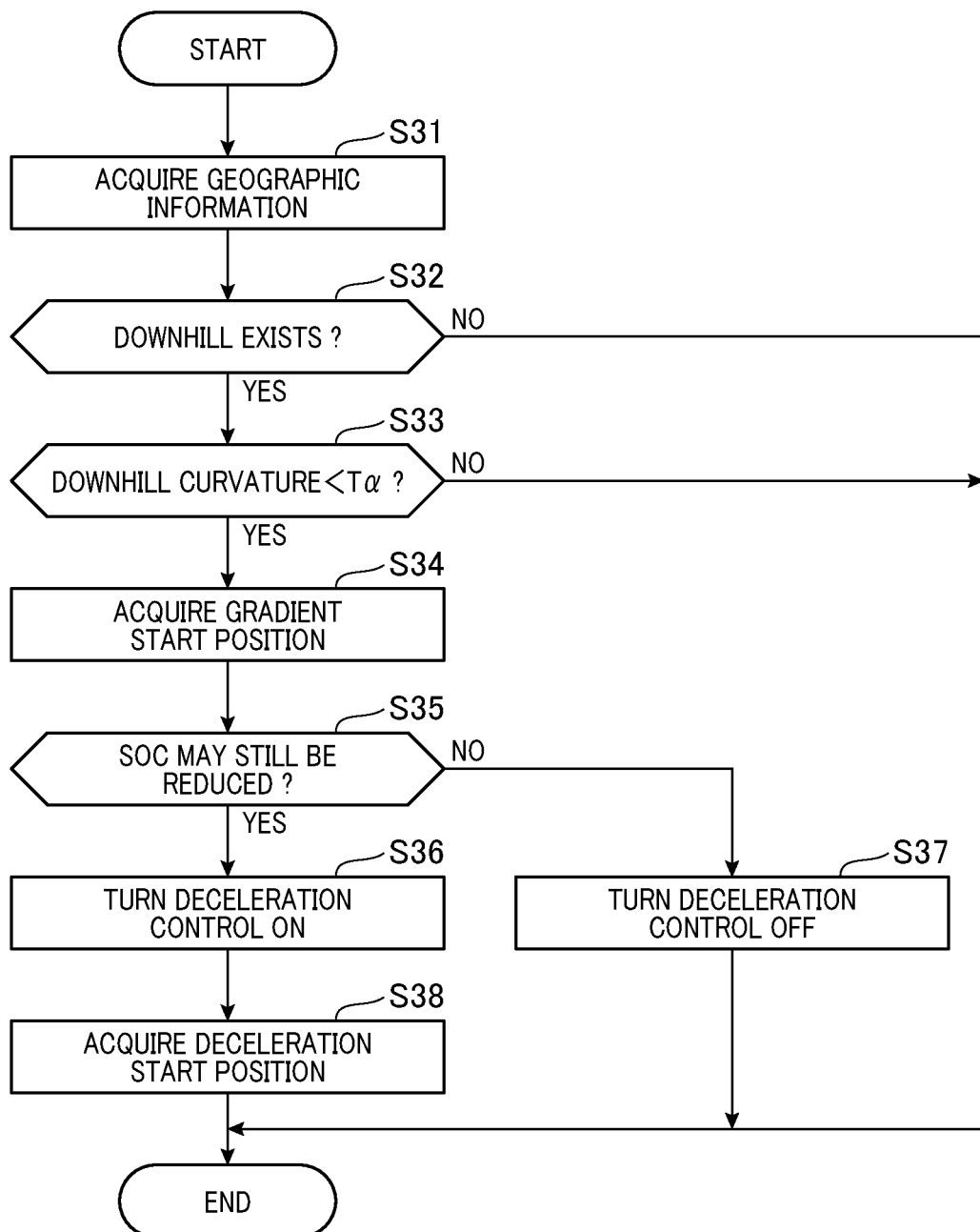
FIG. 11 is an explanatory flowchart showing processes when developing a travel plan for the vehicle 100.

Next, specific processes by the vehicle control device 50 for performing the drive control of the vehicle 100, which is shown in FIGS. 10A to 10D, are described with reference to the other drawings. FIG. 11 is an explanatory flowchart showing processes when developing a travel plan for the vehicle 100. The travel plan shown in FIG. 11 is implemented, for example, when the vehicle is in the cruise control mode.

In Step S31, the ACCECU 54 acquires geographic information necessary for the travel plan. Also in Step S31, as in Step S11, the geographic information is acquired based on a travel route selected via the navigation device 60 by the driver or the other passenger.

In Step S32, the ACCECU 54 searches for the downhill that satisfies the condition for performing regeneration. Also in Step S32, the same process as that of Step S12 in FIG. 3 is executed. When an appropriate downhill is detected (YES at Step S32), the ACCECU 54 proceeds to Step S33. Meanwhile, when the no appropriate downhill is detected (NO at Step S32), the ACCECU 54 ends the travel planning process.

In Step S33, the ACCECU 54 determines a curvature of the downhill detected in Step S32. In the case where the curvature of the downhill is large, when the speed of the vehicle 100 is changed, there is a risk that the driver will feel a sense of discomfort. As a countermeasure, when the curvature of the downhill is equal to or larger than a preset threshold Ta (NO at Step S33), the ACCECU 54 ends the travel planning process. As a result, the deceleration control is not performed in the vehicle 100. The HVECU 53 executes the process of Step S33 so that the vehicle control device 50 functions as a curvature acquisition unit.

When the curvature of the downhill is smaller than the threshold Ta (YES at Step S33), the ACCECU 54 proceeds to Step S34. In Step S34, the ACCECU 54 acquires the gradient start position Dd of the downhill on which regeneration is performed.

In Step S35, the ACCECU 54 determines whether the charge level SOC may still be reduced. When the charge level SOC may still be reduced, the ACCECU 54 turns the deceleration control ON (Step S36). When the charge level SOC may not still be reduced, the ACCECU 54 turns the deceleration control OFF (Step S37). Whether the charge level SOC may still be reduced is determined based on the energy efficiency of the vehicle 100 that travels on the downhill. Specifically, in the case where the vehicle speed when the vehicle 100 travels on the downhill while performing regeneration including the deceleration control is lower than the vehicle speed before traveling downhill, the ACCECU 54 determines that the charge level SOC is not allowed to be further reduced.

Figure 13A:
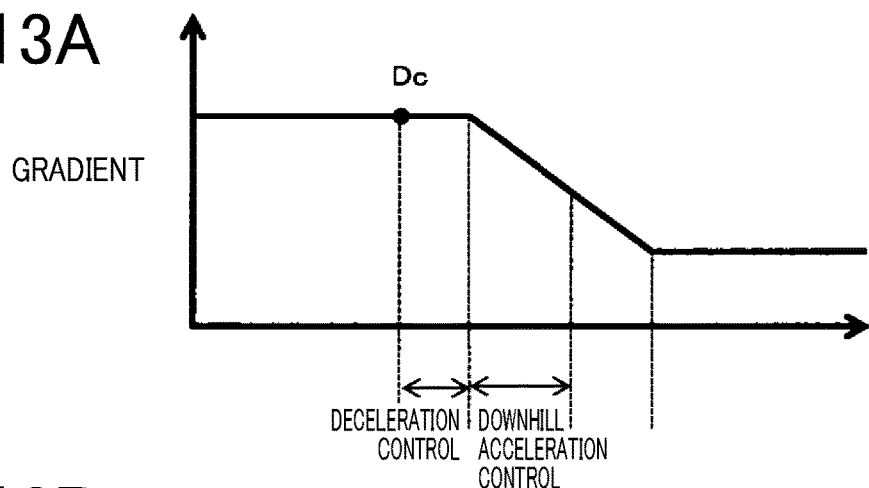
FIG. 13A is an explanatory chart showing the processes of Step S35 for determining whether to perform the deceleration control.
Figure 13B:
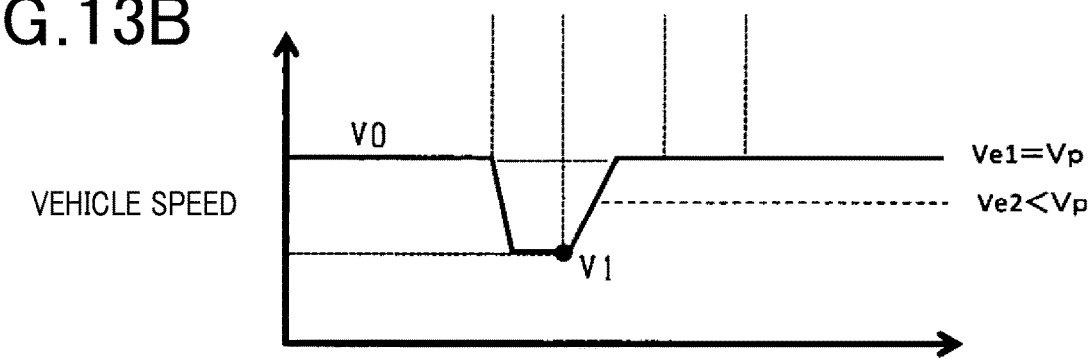
FIG. 13B is an explanatory chart showing the processes of Step S35 for determining whether to perform the deceleration control.

FIG. 12 is a flowchart showing processes of Step S35 in detail. Further, FIGS. 13A and 13B are explanatory charts showing the processes of Step S35 for determining whether to perform the deceleration control. Also in FIG. 12, processes from Steps S351 to S353 may be the same as the processes from Steps S141 to S143 in FIG. 4.

First, in Step S351, the ACCECU 54 sets the target vehicle speed V1 in the deceleration control. Next, in Step S352, the ACCECU 54 sets the driving-force upper limit value MD in the deceleration control. Further, in Step S353, based on the target vehicle speed set in Step S351 and on the driving-force upper limit value MD set in Step S352, the ACCECU 54 calculates the deceleration start position Dc.

In Step S354, the ACCECU 54 acquires gradient information items of the downhill on which the regeneration is performed. For example, the ACCECU 54 acquires, as the gradient information items of the downhill, a gradient angle and a gradient distance.

In Step S355, the ACCECU 54 calculates an estimated vehicle speed Ve of the vehicle 100 assuming that the vehicle 100 finishes traveling downhill after the deceleration control is performed. The estimated vehicle speed Ve refers to a speed of the vehicle 100 at an end point of the downhill in the case where the vehicle 100 travels on this downhill after the deceleration control is performed. The ACCECU 54 calculates the estimated vehicle speed Ve based, for example, on potential energy that is obtained when the vehicle 100 travels on the detected downhill, the target vehicle speed V1 of the vehicle 100 in the deceleration control, and a weight of the vehicle 100.

In Step S356, the ACCECU 54 compares the estimated vehicle speed Ve and the current vehicle speed Vp to each other. As shown in FIGS. 13A and 13B, if an estimated vehicle speed (Ve1) is equal to or more than the current speed Vp, even when the deceleration control is performed, the speed of the vehicle 100 can be restored by using, during the downhill acceleration control, the potential energy that is obtained by traveling downhill. Thus, the ACCECU 54 proceeds to Step S357, and determines that the charge level SOC may still be reduced. Meanwhile, if an estimated vehicle speed (Ve2) is less than the current speed Vp, when the deceleration control is performed, the speed of the vehicle 100 cannot be restored even by using the potential energy that is obtained by traveling downhill. Thus, the ACCECU 54 proceeds to Step S358, and determines that the charge level SOC is not allowed to be further reduced.

Referring back to FIG. 11, when the charge level SOC may still be reduced (YES at Step S35), in Step S36, the ACCECU 54 turns the deceleration control ON. Thus, in Step S38, the ACCECU 54 acquires the deceleration start position Dc. At the time of acquiring the deceleration start position Dc in Step S38, for example, the value calculated in Step S353 may be used. When the deceleration control is turned ON, before the downhill on which the regeneration is performed, the vehicle 100 reduces its vehicle speed so as to reduce the charge level SOC of the battery.

When the charge level SOC is not allowed to be further reduced (NO at Step S35), in Step S37, the ACCECU 54 turns the deceleration control OFF. In other words, a higher priority is given to increasing the energy efficiency while traveling downhill over increasing the regeneration efficiency by the deceleration control.

Figure 14:
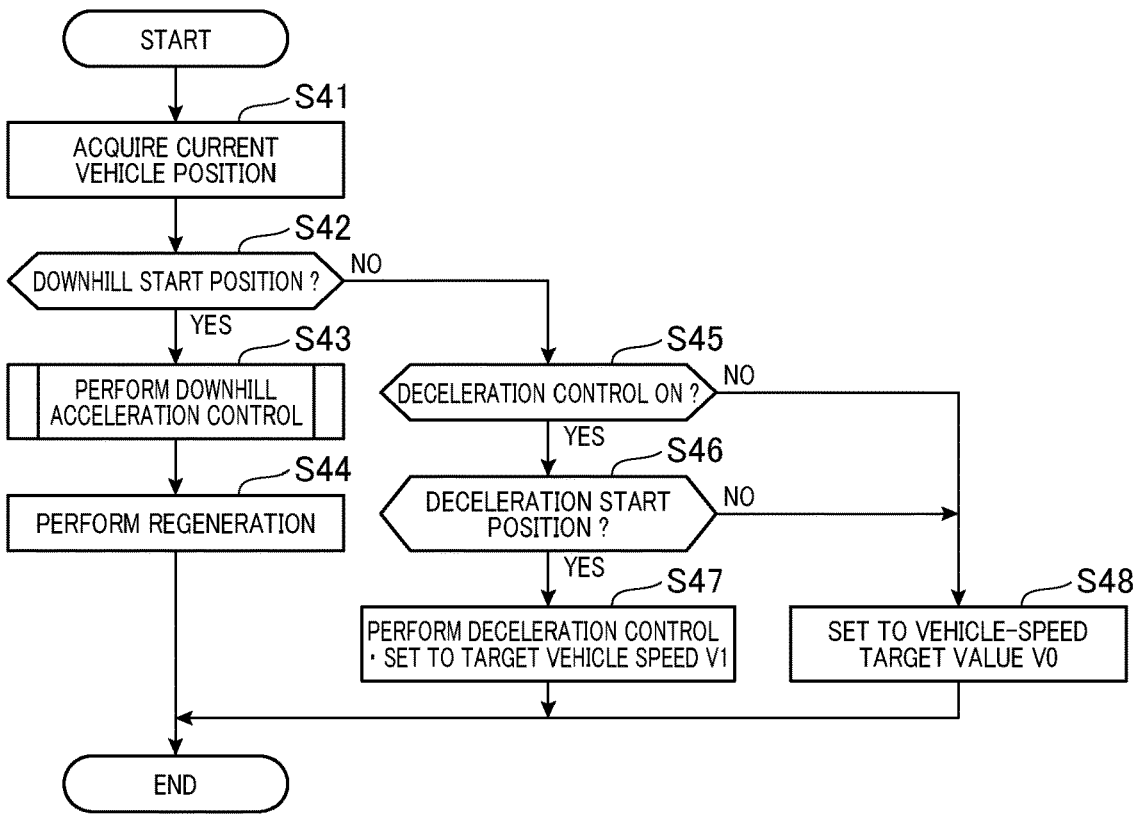
FIG. 14 is an explanatory flowchart showing drive control of the vehicle 100.

Next, with reference to the positions (Dd and Dc) acquired in the travel plan in the second embodiment, the processes during the regeneration in the vehicle 100 are described. FIG. 14 is an explanatory flowchart showing drive control of the vehicle 100. Processes of Steps S41, S42, S44, S47, and S48 shown in FIG. 14 may similarly be the same as the processes shown in FIG. 6. The HVECU 53 executes the process of Step S44 in FIG. 14 so that the vehicle control device 50 functions as a regeneration control unit, and the HVECU 53 executes the process of Step S43 so that the vehicle control device 50 functions as a downhill-acceleration control unit.

In Step S41, the HVECU 53 acquires the current vehicle position Dp. In Step S42, the HVECU 53 determines whether the vehicle 100 has reached the gradient start position Dd of the downhill on which the regeneration is performed. In the case where the vehicle 100 has not yet reached the gradient start position Dd (NO at Step S42), in Step S45, the HVECU 53 determines whether the deceleration control has been set to ON. In the case where the deceleration control has not been set to ON (NO at Step S45), in Step S48, the HVECU 53 sets the target vehicle speed V0.

Further, in the case where the deceleration control has been set to ON (YES at Step S45), in Step S46, the HVECU 53 determines whether the vehicle 100 has reached the deceleration start position Dc. In the case where the vehicle 100 has not yet reached the deceleration start position Dc (NO at Step S46), in Step S48, the HVECU 53 sets the target vehicle speed to V0.

In the case where the vehicle 100 has reached the deceleration start position Dc (YES at Step S46), in Step S47, the HVECU 53 performs the deceleration control. In the deceleration control, the HVECU 53 causes the vehicle 100 to be switched to the EV drive mode such that the vehicle 100 is decelerated to the vehicle speed (V1). With this, the charge level SOC of the battery 40 is reduced.

In the case where the vehicle 100 has reached the gradient start position Dd of the downhill (YES at Step S42), in Step S43, the HVECU 53 performs the downhill acceleration control. In this downhill acceleration control, in a specific zone while raveling downhill, the vehicle 100 is accelerated without performing regeneration.

Figure 15:
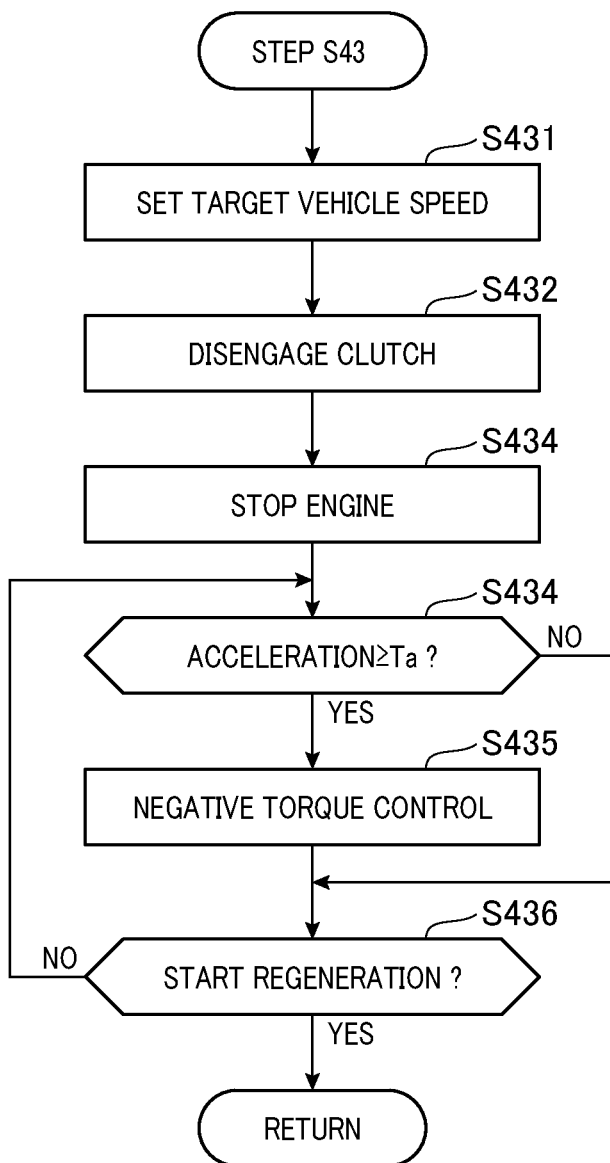
FIG. 15 is a flowchart showing downhill acceleration control.

FIG. 15 is a flowchart showing the downhill acceleration control that is performed in Step S43.

In Step S431, the HVECU 53 sets a target vehicle speed V4. The target vehicle speed V4 refers to an upper limit value of the vehicle speed of the vehicle 100 in the downhill acceleration control. For example, the HVECU 53 sets, as the target vehicle speed V4, a speed that is higher than the current vehicle speed Vp (or higher than a vehicle speed after the deceleration control) within a range of the increased amount of the vehicle speed set by the cruise control.

In Step S432, the HVECU 53 disconnects transmission of the engine output. For example, the HVECU 53 issues an instruction to the clutch 33 to disconnect the engine 31 and the motor 32 from each other. In response thereto, the clutch 33 enters a disengaged state, and stops transmitting the driving force from the engine 31.

In Step S433, the HVECU 53 stops the engine 31. For example, the HVECU 53 issues an instruction to the engine ECU 51 to stop the engine 31. In response to this instruction, the engine ECU 51 stops internal combustion of the engine 31.

In Step S434, the HVECU 53 monitors acceleration of the vehicle 100. When the acceleration of the vehicle 100 while traveling downhill is increased by the potential energy, there is a risk that the driver and the other passengers feel a sense of discomfort. As a countermeasure, when the acceleration is equal to or more than a threshold Ta (YES at Step S434), in Step S435, the HVECU 53 performs negative torque control for decelerating the vehicle 100. In this negative torque control, the HVECU 53 issues an instruction to the motor ECU 52 to generate a torque in a direction opposite to a rotational direction of the rotor of the motor 32. In response to this instruction, the motor ECU 52 applies to a stator so as to generate a negative torque.

In Step S436, the HVECU 53 determines whether the vehicle 100 has satisfied a condition for starting the regeneration. The condition for starting the regeneration is satisfied, for example, when the vehicle 100 travels by a predetermined distance on the downhill. In the case where the vehicle 100 has not yet satisfied the condition for starting the regeneration (NO at Step S436), the HVECU 53 returns to Step S434, and continues to monitor the acceleration. Meanwhile, in the case where the vehicle 100 has satisfied the condition for starting the regeneration (YES at Step S436), the HVECU 53 ends the processes for the downhill acceleration control.

Referring back to FIG. 14, in Step S44, the HVECU 53 performs the regeneration. The power generated by the motor 32 through the regeneration is supplied to the battery 40 via the inverter unit 39. With this, the battery 40 is charged.

Note that, performing the downhill acceleration control from a gradient start point of the downhill is merely an example. Alternatively, the downhill acceleration control may be performed a plurality of times while traveling downhill. Still alternatively, the downhill acceleration control may be performed after the regeneration.

In order to perform the downhill acceleration control, the vehicle 100 need not necessarily include the navigation device 60. For example, the vehicle 100 may include a gradient detection sensor (not shown) such that the HVECU 53 determines that the vehicle 100 is traveling downhill based on an output from this gradient detection sensor. With this configuration, the downhill acceleration control and the regeneration may be performed. In this case, the HVECU 53 specifies the gradient start position of the downhill in response to the output from the gradient detection sensor in Step S41 in FIG. 14, and then executes the series of processes (Steps S42 to S48). Further, detection of the deceleration start position Dc is performed in this Step S41.

As described above in this second embodiment, the vehicle 100 is accelerated by the downhill acceleration control in a specific zone on the downhill in which the regeneration is performed. In this downhill acceleration control, in the specific zone on the downhill, the vehicle 100 is caused to travel without using the engine output as its driving force, and without performing regeneration. In other words, in this zone, the potential energy from the downhill is directly converted to the kinetic energy. As a result, a proportion in which the potential energy at the time when the vehicle 100 travels on the downhill is converted to electric energy by the regeneration can be reduced, and the energy efficiency of the vehicle can be increased.

The vehicle 100 includes the clutch 33 (transmission switching unit) that switches whether to perform the transmission of the engine output to the driving force, and the downhill-acceleration control unit causes the transmission switching unit to disconnect the transmission of the engine output in the downhill acceleration control. With this configuration, in the downhill acceleration control, loss that is caused, for example, by engine braking can be reduced, and hence the energy efficiency can be increased.

In the downhill acceleration control, the downhill-acceleration control unit stops the engine. With this configuration, in the downhill acceleration control, degradation in fuel efficiency of the engine under low load can be suppressed. As a result, the energy efficiency can be increased.

In the downhill acceleration control, when the acceleration of the vehicle 100 is equal to or more than a threshold, the downhill-acceleration control unit causes the motor 32 to generate negative torque. With this configuration, a sense of discomfort to the driver and the other passengers, which is caused as a result of the acceleration of the vehicle 100, can be reduced.

The curvature acquisition unit acquires a curvature of the downhill based on the geographic information that is supplied from the navigation device 60. The downhill-acceleration control unit does not perform the downhill acceleration control when the curvature is equal to or more than a threshold. With this configuration, the downhill acceleration control is not performed on a downhill having a large curvature, and hence a sense of discomfort to the driver and the other passengers can be reduced.

The deceleration control unit performs the deceleration control for causing the vehicle 100 to travel at reduced speed before the downhill acceleration control is performed. With this configuration, the vehicle can be accelerated after being once decelerated to a preset speed. As a result, the vehicle speed can be restrained from increasing extremely by the downhill acceleration control.

The downhill-acceleration control unit performs the downhill acceleration control under the state in which the vehicle is in the constant-speed control mode. With this configuration, in the constant-speed control mode at a preset speed, vehicle speed control can be performed without causing the driver to feel a sense of discomfort.

Third Embodiment

Figure 16:
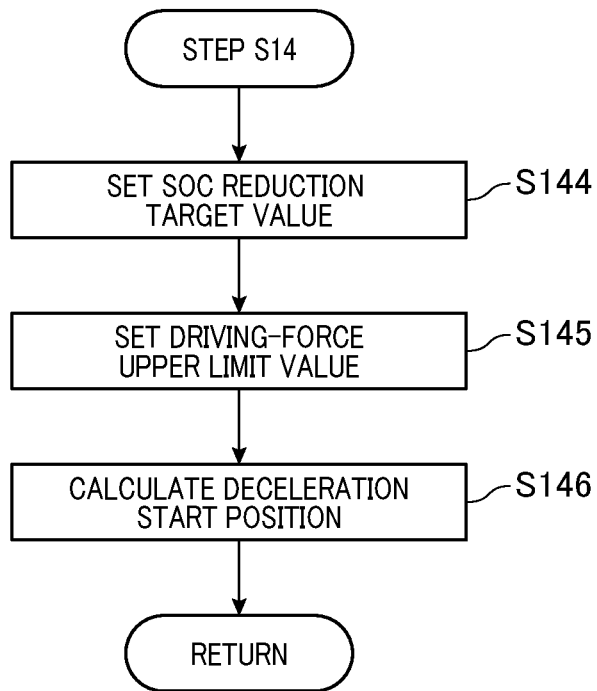
FIG. 16 is a flowchart showing how the deceleration start position Dc is set.
Figure 17:
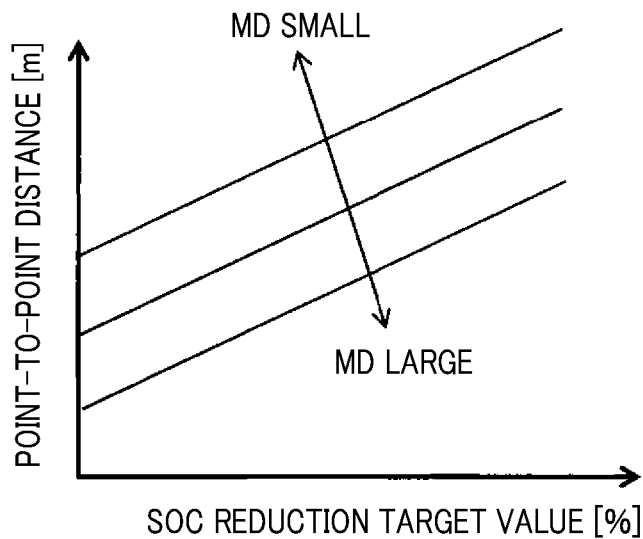
FIG. 17 is a map showing a relationship between a reduction target value of the charge level SOC and a distance L from a gradient start position Dd of a downhill to the deceleration start position Dc.

Setting the deceleration start position Dc based on the target vehicle speed V1 is merely an example. For example, the deceleration start position Dc may be set based on a reduction target value of the charge level SOC. FIG. 16 is a flowchart showing how the deceleration start position Dc is set in a third embodiment. The flowchart of FIG. 16 shows processes that are executed, for example, in Step S14 of FIG. 3. Further, FIG. 17 is a map showing a relationship between the reduction target value of the charge level SOC (SOC reduction target value) and the distance (point-to-point distance) L from the gradient start position Dd of the downhill to the deceleration start position Dc.

In FIG. 16, in Step S144, the ACCECU 54 sets the SOC reduction target value. As in FIG. 9, the SOC reduction target value is set within the range from the thresholds Sa to Sb.

In Step S145, the ACCECU 54 sets the driving-force upper limit value MD. As in the first embodiment, the driving-force upper limit value MD is set within the driving-force range in which the vehicle 100 is driven in the EV drive mode.

In Step S146, the ACCECU 54 calculates the deceleration start position Dc based on the SOC reduction target value set in Step S144. At this time, the ACCECU 54 sets the deceleration start position Dc so as to establish a relationship in which the point-to-point distance L become longer as the SOC reduction target value becomes larger.

For example, the ACCECU 54 includes a map that defines the relationship shown in FIG. 17 between the SOC reduction target value and the point-to-point distance L. As defined in this map, the relationship between the SOC reduction target value and the point-to-point distance varies in accordance with the driving-force upper limit value MD set in Step S145. Thus, with respect to the same SOC reduction target value, the point-to-point distance L becomes shorter as the driving-force upper limit value MD becomes larger. In contrast, with respect to the same SOC reduction target value, the point-to-point distance L becomes longer as the driving-force upper limit value MD becomes smaller.

As described above in this third embodiment, the deceleration start position Dc in the deceleration control is set in accordance with the reduction target value of the charge level SOC of the battery 40. With this, intended reduction of the charge level SOC can be performed in the deceleration control.

Fourth Embodiment

Performing the deceleration control only once before traveling downhill as in the first to the third embodiments described above is merely an example. The deceleration control may be repeated a plurality of times before traveling downhill. Alternatively, when the acceleration control is performed before the deceleration control is performed, the acceleration control and the deceleration control may each be repeated a plurality of times before the downhill.

Figure 18:
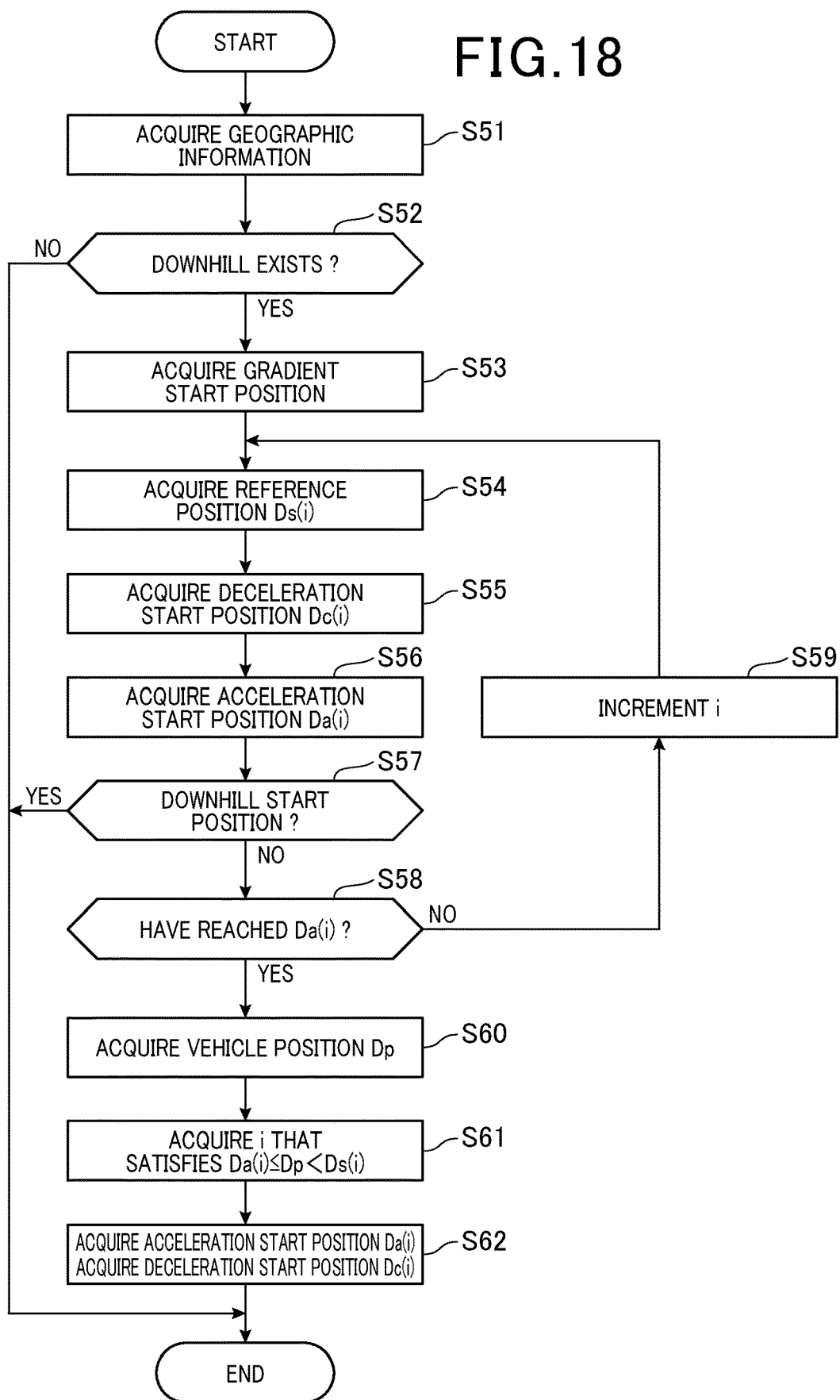
FIG. 18 is an explanatory flowchart showing production of a travel plan according to a fourth embodiment.

FIG. 18 is an explanatory flowchart showing production of a travel plan according to a fourth embodiment. The deceleration start position Dc and the acceleration start position Da acquired in this travel plan are used, for example, in the drive control shown in FIG. 6.

In Step S51, the ACCECU 54 acquires geographic information. Further, in Step S52, the ACCECU 54 searches for a downhill on which the regeneration can be performed. The ACCECU 54 searches for any appropriate downhill within a range of a search distance QD1 from a current position of a vehicle. When the downhill is detected (YES at Step S52), in Step S53, the ACCECU 54 acquires the gradient start position Dd.

In Step S54, the ACCECU 54 acquires a reference position Ds(i) for setting the acceleration start position and the deceleration start position. The reference position Ds(i) refers to a variable for setting a position as a reference for searching for an acceleration start position Da(i) and a deceleration start position Dc(i). For example, in a first search, a value of the reference position Ds(i) corresponds to the gradient start position Dd of the downhill acquired in Step S51.

In Step S55, the ACCECU 54 acquires the deceleration start position Dc(i) being a start position of the deceleration control. In Step S56, the ACCECU 54 acquires the acceleration start position Da(i) being a start position of the acceleration control. The positions that are acquired in Steps S55 and S56 are set, for example, within a range of a search distance QD2 (QD2<QD1) from the reference position Ds(i). In a travel plan to cause the vehicle 100 to perform the deceleration control and the acceleration control N times each (N is an integer number equal to or greater than 1) before the vehicle 100 reaches the gradient start position Dd, the search distance QD2 is shorter than a distance obtained by dividing the search distance QD1 by N. In addition, the positions may be acquired by the same methods as those in the other embodiments described above.

In Step S57, the ACCECU 54 determines whether the position of the vehicle 100 has reached the gradient start position Dd. In the case where the position of the vehicle 100 has not yet reached the gradient start position Dd (NO at Step S57), in Step S58, the ACCECU 54 determines whether the position of the vehicle 100 has reached the acceleration start position Da(i) acquired in Step S56.

In the case where the vehicle 100 has not yet reached the acceleration start position Da(i) (NO at Step S58), in Step S59, the ACCECU 54 increments a counter i for identifying a search target. When the counter i is incremented (i+1), in Steps S54 to S56, the search range is changed before a range that is searched based on the counter i in an advancing direction of the vehicle 100. Specifically, when the ACCECU 54 inputs the acceleration start position Da(i) acquired in Step S58 as a reference position Ds(i+1), a deceleration start position Dc(i+1) and an acceleration start position Da(i+1) are searched for before this updated reference position Ds(i+1) in the advancing direction of the vehicle 100. Note that, in this embodiment, the deceleration start position Dc(i+1) and the acceleration start position Da(i+1) are searched for within a similar range of the search distance QD2 from the reference position Ds(i+1).

In the case where the vehicle 100 has reached the acceleration start position Da(i) (YES at Step S58), the ACCECU 54 proceeds to Step S60. The vehicle 100 has reached the acceleration start position Da(i), and hence the HVECU 53 needs to perform the acceleration control. Thus, in Step S60, first, the ACCECU 54 acquires the position Dp of the vehicle 100.

In Step S61, by using the vehicle position Dp acquired in Step S60, the ACCECU 54 searches for a counter i that satisfies the acceleration start position Da(i). For example, the ACCECU 54 searches for a counter i that satisfies a relationship of Da(i)≤Dp<Ds(i) from among the counters i updated by the series of processes of Steps S54 to S59.

In Step S62, based on the counter i specified in Step S61, the ACCECU 54 acquires an acceleration start position Da(i) and a deceleration start position Dc(i).

Then, with use of the acceleration start position Da(i) and the deceleration start position Dc(i) set in FIG. 18, the drive control of the vehicle 100, which is shown in FIG. 6, is performed. As a matter of course, the processes shown in FIG. 18 are repetitively performed in a predetermined cycle. Further, as another example of the second embodiment, when the downhill acceleration control is performed, the drive control of the vehicle 100, which is shown in FIG. 14, is performed with use of the acceleration start position Da(i) and the deceleration start position Dc(i) set in FIG. 18.

As described above in this fourth embodiment, before the vehicle enters the downhill, the acceleration control and the deceleration control are each performed a plurality of times.

Thus, the charge level SOC can be reduced a plurality of times, and hence the reduction rate of the charge level SOC can be increased in a period before traveling downhill.

Other Embodiments

In the vehicle 100, the engine and the motor are coupled to each other with the single clutch with respect to the drive shaft. However, this configuration is merely an example. As another example of the configuration of the vehicle 100, there may be mentioned a configuration in which the engine and the motor are coupled to each other with double clutches with respect to the drive shaft. In addition, instead of the clutch, a power division mechanism that uses planetary gears may be employed as the driving-force transmission mechanism. In the configuration of the vehicle 100 in this case, the engine and double motors may be used with respect to the drive shaft, and the engine output and the motor output may be obtained via the power division mechanism. Alternatively, instead of the configuration including the driving-force transmission mechanism that couples the engine and the motor to each other, the vehicle 100 may have a configuration in which the engine and the motor are coupled directly to each other through intermediation of the output shaft, or a configuration in which the engine is connected to an output shaft on a front wheel side and in which the motor is connected to an output shaft on a rear wheel side.

The deceleration control and the downhill acceleration control of the vehicle 100 need not necessarily be performed when the vehicle 100 is under the cruise control. For example, the deceleration control and the downhill acceleration control described above may be performed under a state in which the vehicle 100 travels in modes other than the cruise control.

In the deceleration control, instead of setting only one target vehicle speed V1, the speed before reaching the target vehicle speed V1 may be set in a plurality of stages on a travel route on which the deceleration control is performed. With this configuration, the vehicle speed in the deceleration control can be reduced in a stepwise manner, and hence the vehicle 100 can be decelerated without causing the driver and the other passengers to feel a sense of discomfort.

It should be understood that the present disclosure, which has been described with reference to the embodiments, is not limited to these embodiments and the structures. The present disclosure also encompasses various modifications and equivalents. In addition, various combinations and modes, and other combinations and modes that additionally include only a single or more or fewer elements are also encompassed within the scope and the technical idea of the present disclosure.

The invention claimed is:

1. A vehicle control device including
an engine, and
a motor that is driven by power supplied from a rechargeable battery, the vehicle control device controlling a vehicle that uses at least one of engine output and motor output as a driving force, the vehicle control device comprising:
a search unit that searches, based on geographic information to be supplied from a navigation device, for a downhill on which regeneration by the motor can be performed; and
a charge level control unit that performs, at a deceleration start position before the downhill that has been specified, deceleration control for reducing a charge level of the rechargeable battery by reducing a vehicle speed, wherein
in the deceleration control, the vehicle speed is reduced by reducing the driving force of the vehicle to a level at which only the motor output is used as the driving force.

2. The vehicle control device according to claim 1, wherein:
in accordance with increase in the driving force, the vehicle is switched from a mode of using only the motor output to a mode of using the engine output and the motor output in combination with each other; and
in the deceleration control, an upper limit value of the driving force of the vehicle is set within a range in which only the motor output is used.

3. The vehicle control device according to claim 1, wherein:
the charge level control unit monitors changes in the charge level of the rechargeable battery during the deceleration control; and
when the charge level is equal to or less than a threshold, the charge level control unit stops the deceleration control.

4. The vehicle control device according to claim 1, further comprising a deceleration position search unit that searches for the deceleration start position based on a vehicle speed of the vehicle after deceleration, the vehicle speed of the vehicle after the deceleration being set in the deceleration control.

5. The vehicle control device according to claim 4, wherein
the deceleration position search unit sets the vehicle speed after the deceleration such that a vehicle-speed reduction rate becomes higher as a vehicle speed of the vehicle before the deceleration control becomes higher.

6. The vehicle control device according to claim 1, wherein
the charge level control unit performs acceleration control for accelerating the vehicle before performing the deceleration control.

7. The vehicle control device according to claim 6, wherein
the charge level control unit increases an increased amount of a vehicle speed in the acceleration control as a vehicle speed of the vehicle before the acceleration control becomes higher.

8. The vehicle control device according to claim 1, further comprising a downhill-acceleration control unit that causes, when the vehicle travels on the downhill, the vehicle to be accelerated in a specific zone on the downhill without allowing the vehicle to use the engine output as the driving force, and without causing the motor to perform the regeneration.

9. The vehicle control device according to claim 8, wherein
the downhill-acceleration control unit performs the deceleration control when the vehicle is in a constant-speed control mode in which the vehicle speed of the vehicle is adjusted to a preset speed.

* * * * *